US 9,575,628 B2

(12) United States Patent
Meegan et al.

(10) Patent No.: US 9,575,628 B2
(45) Date of Patent: Feb. 21, 2017

(54) ICON FEATURED TOUCH SCREEN DISPLAY SYSTEM INCLUDING STATUS SHORTCUTS FOR A WORK VEHICLE AND METHOD OF MANAGING THE SAME

(71) Applicant: DEERE & COMPANY, Moline, IL (US)

(72) Inventors: Robert Meegan, Urbandale, IA (US); Bruce Newendorp, Cedar Falls, IA (US); Joshua D. Hoffman, Davenport, IA (US); Kurtis Vander Wiel, Cedar Falls, IA (US); Sean McKay, Iowa City, IA (US)

(73) Assignee: DEERE & COMPANY, Moline, IL (US)

( * ) Notice: Subject to any disclaimer, the term of this patent is extended or adjusted under 35 U.S.C. 154(b) by 484 days.

(21) Appl. No.: 13/906,520

(22) Filed: May 31, 2013

(65) Prior Publication Data

US 2014/0298228 A1 Oct. 2, 2014

Related U.S. Application Data

(60) Provisional application No. 61/806,642, filed on Mar. 29, 2013.

(51) Int. Cl.
*G06F 3/0482* (2013.01)
*G06F 3/0481* (2013.01)
(Continued)

(52) U.S. Cl.
CPC ............ *G06F 3/0482* (2013.01); *B60K 35/00* (2013.01); *B60K 37/06* (2013.01); *G06F 3/0488* (2013.01);
(Continued)

(58) Field of Classification Search
None
See application file for complete search history.

(56) References Cited

U.S. PATENT DOCUMENTS 6,009,354 A 12/1999 Flamme et al.
6,112,144 A * 8/2000 Allen .............................. 701/50
(Continued)

FOREIGN PATENT DOCUMENTS

| CN | 101788882 A | 7/2010 |
|---|---|---|
| KR | 20100032560 A | 3/2010 |
| WO | 2012039238 A1 | 3/2012 |

OTHER PUBLICATIONS

X30 Console; Operator's Manual; Guidance and auto steering; AGA4084-EN-TPA; Rev. 1.4; Jul. 2011; Topcon Precision Agriculture, 10 selected pages provided, 236 pages total available at www.topconpa.com.*
(Continued)

*Primary Examiner* — Edward Martello
(74) *Attorney, Agent, or Firm* — Harness, Dickey & Pierce, P.L.C.

(57) ABSTRACT

At least one example embodiment discloses a method for generating a touch screen display. The method includes establishing a run screen on the touch screen display, the run screen associated with a function of a work vehicle, configuring the run screen with a retractable toolbar, the retractable toolbar responsive to an action of a user of the touch screen display and deployable over a first portion of the run screen upon the action of the user and otherwise hiding to display a second portion of the run screen, the second portion of the run screen being at least a majority portion of the run screen and defining one or more transient user-definable buttons on the retractable toolbar associated with at least one of the function and the run screen.

12 Claims, 18 Drawing Sheets

(51) Int. Cl.
*G06F 3/0488* (2013.01)
*G06F 3/0484* (2013.01)
*B60K 35/00* (2006.01)
*B60K 37/06* (2006.01)

(52) U.S. Cl.
CPC ....... *G06F 3/04817* (2013.01); *G06F 3/04842* (2013.01); *B60K 2350/1004* (2013.01); *B60K 2350/1016* (2013.01); *B60K 2350/1032* (2013.01)

(56) References Cited

U.S. PATENT DOCUMENTS

| | | | |
|---|---|---|---|
| 6,167,337 | A | 12/2000 | Haack et al. |
| 7,548,804 | B2* | 6/2009 | Rossow et al. ................. 701/36 |
| 7,872,587 | B2* | 1/2011 | Hindryckx ........... A01D 41/127 340/684 |
| 8,306,042 | B1 | 11/2012 | Abts |
| 2006/0241838 | A1* | 10/2006 | Mongiardo ............ B60K 37/06 701/50 |
| 2007/0229465 | A1 | 10/2007 | Sakai et al. |
| 2010/0281422 | A1 | 11/2010 | Kano et al. |
| 2010/0325541 | A1 | 12/2010 | Imaizumi et al. |
| 2011/0022310 | A1 | 1/2011 | Ishii et al. |
| 2012/0036435 | A1 | 2/2012 | Yang et al. |
| 2012/0124527 | A1 | 5/2012 | Fujii |
| 2012/0256843 | A1* | 10/2012 | Epple ................... A01D 41/127 345/169 |
| 2013/0038437 | A1 | 2/2013 | Talati et al. |
| 2013/0145297 | A1* | 6/2013 | Ricci ......................... G06F 9/54 715/765 |
| 2016/0041803 | A1* | 2/2016 | Markov ............... A01B 69/001 701/48 |

OTHER PUBLICATIONS

Topcon Precision Agriculture Catalog-7010-0899-RevF-A4-EN, Oct. 2011; 13 page product catalog showing key items pertinent to the invention but not relied upon.*

International Search Report and Written Opinion dated Sep. 5, 2014.

* cited by examiner

ICON FEATURED TOUCH SCREEN DISPLAY SYSTEM INCLUDING STATUS SHORTCUTS FOR A WORK VEHICLE AND METHOD OF MANAGING THE SAME

PRIORITY

This non-provisional application claims priority under 35 U.S.C. §119 to provisional application No. 61/806,642 filed Mar. 29, 2013; the entire contents of which are hereby incorporated by reference.

FIELD

Example embodiments are related to displays including touch screen displays for work vehicles such as off-road work vehicles, agricultural machines, forestry machines, construction machines and heavy equipment.

BACKGROUND

Many work vehicles include displays for displaying a status of the vehicle and various functions of the vehicle. Many of these displays are operated by physical buttons and subject to requirements set by a standard.

SUMMARY

At least one example embodiment discloses a retractable shortcut bar for a touch screen display. The retractable shortcut bar may be a component located at a bottom of a screen. The retractable shortcut bar may serve as a container for shortcut buttons serving various user interface functions.

At least one example embodiment discloses an edit run page set overlay. The edit run page set overlay may include design components for editing a current run page set. The edit run page set overlay gives the user the ability to change the name of the current run page set and to add, remove, and reorder pages within the run page set.

At least one example embodiment discloses a status shortcut for a touch screen display. The status shortcut is a component that may be located on a shortcut bar. The status shortcut allows an operator to observe and/or toggle the status of an application feature without opening the application.

At least one example embodiment discloses a method for generating a touch screen display. The method includes establishing a run screen on the touch screen display, the run screen associated with a function of a work vehicle, configuring the run screen with a retractable toolbar, the retractable toolbar responsive to an action of a user of the touch screen display and deployable over a first portion of the run screen upon the action of the user and otherwise hiding to display a second portion of the run screen, the second portion of the run screen being at least a majority portion of the run screen and defining one or more transient user-definable buttons on the retractable toolbar associated with at least one of the function and the run screen.

At least one example embodiment discloses a method for managing a display of a display system. The method includes establishing a run screen associated with a first function of a work vehicle, providing a location-determining receiver for potential guidance of the work vehicle, establishing a plurality of performance states associated with at least one of the location-determining receiver and a guidance controller and displaying one or more of the performance states by corresponding visually displayable states without changing to another screen of the display.

At least one example embodiment discloses a method for generating a touch screen display. The method includes establishing a first run screen associated with a first function of a work vehicle and establishing a second run screen associated with a second function of the work vehicle distinct from the first function and defining an order of appearance of the first run screen and the second run screen within a set of run screens that allows a user to select a run screen in the set of run screens that are displayable in accordance with the defined order.

BRIEF DESCRIPTION OF THE DRAWINGS

Example embodiments will be more clearly understood from the following detailed description taken in conjunction with the accompanying drawings. FIGS. 1-11E represent non-limiting, example embodiments as described herein.

FIG. 6 illustrates a menu according to an example embodiment;

FIG. 8 illustrates a select dashboard display according to an example embodiment;

FIGS. 11A-11E illustrates an example embodiment of adding and editing a shortcut bar.

DETAILED DESCRIPTION

Figure 1A:
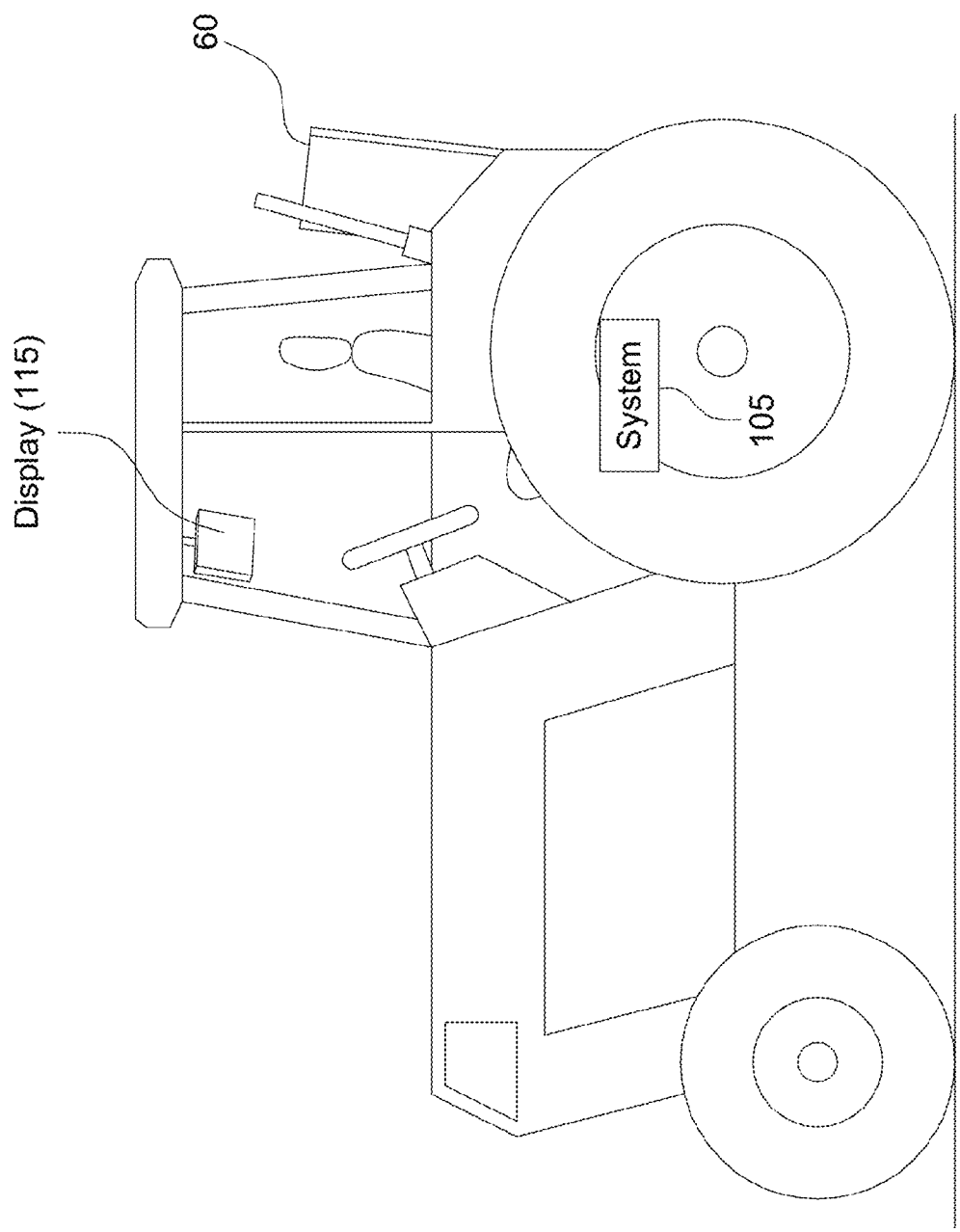
FIG. 1A illustrates a vehicle according to an example embodiment.

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms a processor specifically programmed to execute software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of tangible (or recording) storage medium or implemented over some type of transmission medium. The tangible storage medium may be magnetic (e.g., a floppy disk or a hard drive) or optical (e.g., a compact disk read only memory, or "CD ROM"), and may be read only or random access.

The term implement may refer to a particular piece of equipment or function of the vehicle including a plow, tillage equipment, harvesting head, planter and sprayer.

FIG. 1A illustrates a vehicle 60 in which at least one example embodiment is implemented. The vehicle 60 includes a display system 105 including a display 115. The display 115 may display any features or parameters of the vehicle 60, including, for example, speed and heading information. The display 115 may be used to enter user preference parameters described in further detail below. For example, the display 115 may be used to establish a retracting shortcut bar, status shortcuts and edit run page sets.

Figure 1B:
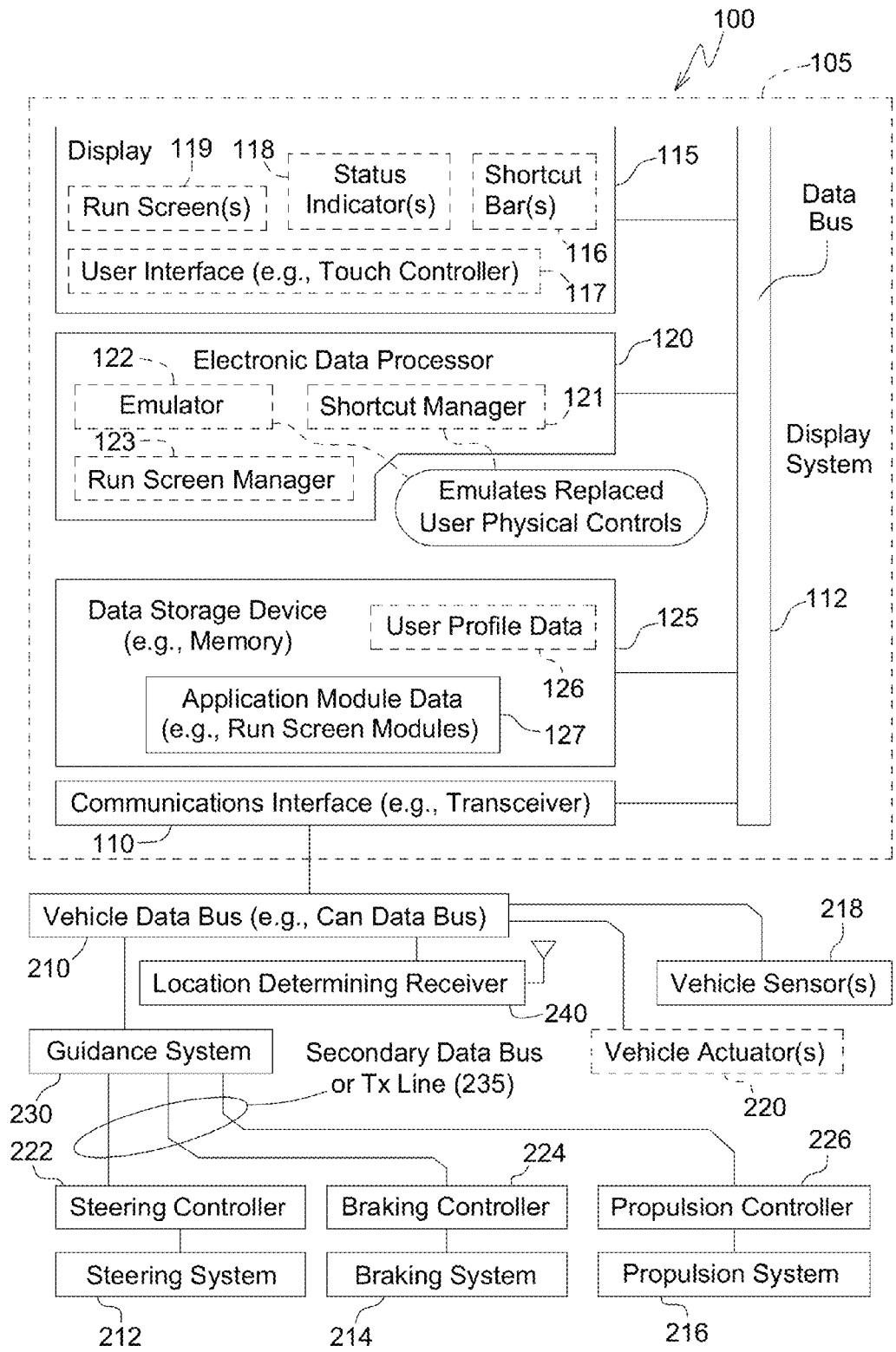
FIG. 1B illustrates a system of a vehicle according to an example embodiment.

Features of the display system 105 are described in further detail with regard to FIG. 1B.

FIG. 1B illustrates a system of a vehicle according to an example embodiment. The vehicle may be a work vehicle such as an off-road work vehicle, agricultural machine, forestry machine, construction machine or heavy equipment vehicle. However, example embodiments are not limited thereto and may be implemented in other types of vehicles.

The system 100 includes electronic modules, software modules, or both. In an example embodiment, the system 100 includes a display system 105 to support storing, processing or execution of software instructions of one or more software modules. The display system 105 is indicated by the dashed lines in FIG. 1B. It should be understood that the system 100 may include other systems configured to support storing, processing or execution of software instructions of one or more software modules in the functioning of the machine. However, for the sake of brevity, they will not be described understanding that FIG. 1B is not limited just to the features shown in FIG. 1B.

The lines that are interconnecting the aforementioned devices may be physical data paths, logical data paths, or both. Physical data paths are defined by transmission lines or data buses. Data buses may be, for example, Control Area Network (CAN) buses or ISO buses. Logical data paths may comprise logical or virtual communications that take place within software or between software modules.

The display system 105 is configured receive data regarding systems (e.g., steering system 212, braking system 214, propulsion system 216, vehicle sensor(s) 218), components and implements via a communications interface 110 in the display system 105 that accesses a vehicle data bus 210. The vehicle data bus 210 may be a controller area network (CAN) data bus, for example.

The communications interface 110 may receive and transmit messages containing further data to/from the vehicle data bus 210 such as, for example, the steering system 212, braking system 214, propulsion system 216, vehicle sensor(s) 218 or other controller of the vehicle connected on the data bus. The messages may be implemented using a protocol such as CAN. The messages may contain data including operational parameters or other parameters related to the vehicle provided by the sensors 218, for example, temperature gauges, magnetic wheel speed sensors, traction control sensors, etc.

Each of the steering system 212, braking system 214 and propulsion system 216 receives commands from and communicates data to a steering controller 222, braking controller 224 and propulsion controller 226, respectively.

The steering system 212 cooperatively operates with the steering controller 222 to control the steering of the vehicle. For example, if a user of the vehicle selects a certain track (route) to follow, the steering controller 222 receives commands from a guidance system 230 and controls the steering system 212 such that the vehicle follows the selected route. Moreover, the steering controller 222 may control the steering system 212 in a conventional manner when a user is manually driving. The steering system 212 may be an electrical steering system, a drive-by-wire steering system, an electro-hydraulic steering system, or a hydraulic steering system with an electronic control interface, for example.

The vehicle data bus 210 provides signals to the steering controller 222 from the display system 105. For example, the vehicle data bus 210 may provide signals including CAN messages to the steering controller 222. The messages may include, for example, commands such as steering angle commands or position data.

The braking system 214 cooperatively operates with the braking controller 224 to control the braking of the vehicle. For example, if a user of the vehicle selects a certain track (route) to follow, braking controller 224 receives commands from the guidance system 230 and controls the braking system 214 to brake when the vehicle is approaching a turn. Moreover, the braking controller 224 may control the braking system 214 in a conventional manner when a user is manually driving.

The propulsion controller 226 cooperatively operates with the propulsion system 216 to control the propulsion of the vehicle. The propulsion may be any known motor or engine, for example. For example, if a user of the vehicle selects a certain track (route) to follow, propulsion controller 226 receives commands from the guidance system 230 and controls the propulsion system 216 to move the vehicle along the selected route. Moreover, the propulsion controller 226 may control the propulsion system 216 in a conventional manner when a user is manually driving.

As described above, the steering controller 222, braking controller 224 and propulsion controller 226 communicate with the guidance system 230. The steering controller 222, braking controller 224 and propulsion controller 226 may communicate with the guidance system 230 through a secondary data bus or transmission line 235. The guidance system 230 provides information to the steering controller 222, braking controller 224 and propulsion controller 226 regarding location and route. Moreover, the guidance system 230 is connected to the vehicle data bus 210 and obtains data and commands regarding which location and route to follow, for example. The guidance system 230 may be a Global Positioning System (GPS) system or another type of guidance system.

The guidance system 230 may automatically steer the vehicle in accordance with a path plan (e.g., linear path or contour) based on GPS position measurements or navigation system measurements.

A location determining receiver 240 is connected to the vehicle data bus 210, as well. The location determining receiver 240 may be a GPS receiver, for example. The location determining receiver 240 transmits the location to the display system 105 and guidance system 230 through the vehicle data bus 210. The location-determining receiver 240 may provide one or more of the following data types: position data (e.g., expressed as geographic coordinates), velocity data, and acceleration data. Velocity data further comprises speed data and heading data for the vehicle. The location determining receiver 240 transmits the data to the display system 105 and guidance system 230 through the vehicle data bus 210. The aforementioned data may further be displayed on the display 115 of the display system 105.

The vehicle may include various actuators 220. For example, an electrical steering system or a drive-by-wire steering system may include an electric motor or actuator that is mechanically coupled to rotate or steer at least one wheel of the vehicle.

As described, the display system 105, transmits and receives data regarding the vehicle through the communications interface 110. The communications interface is connected to a data bus 112. In addition to the communications interface 110, the display 115 and the data bus 112, the display system 105 further includes a processor 120 and a data storage device 125.

The communications interface 110, the display 115, the data bus 112, the processor 120 and the data storage device 125 are connected to the data bus 112 and are configured to communicate through the data bus 112.

The processor 120 implements algorithms and other functionality of the display system 105 described in further detail below.

The processor 120 may be any type of processor configured to execute program codes such as those stored in the data storage device 125.

In an example embodiment, the processor 120 may include an electronic data processor, a digital signal processor, microprocessor, a microcontroller, a programmable logic array, a logic circuit, an arithmetic logic unit, an application specific integrated circuit, a digital signal processor, a proportional-integral-derivative (PID) controller, or another data processing device.

The data storage device 125 may include any magnetic, electronic, or optical device for storing data. For example, the data storage device 125 may include an electronic data storage device, an electronic memory, non-volatile electronic random access memory, one or more electronic data registers, data latches, a magnetic disc drive, a hard disc drive, an optical disc drive, or the like. The processor 120 outputs results of algorithms and other functionality of the display system 105 to the data bus 112.

The data storage device 125 may store user profile data 126 and application module data 127. The user profile data 126 may include data representing a skill level of the user and authorization level of the user. For example, the skill level may be beginner, intermediate and advanced. The application module data 127, which is Run Screen Module or software module that is dedicated or programmed to perform, monitor and/or control a certain work task (e.g., planting, seeding, spraying, harvesting, leveling, tilling) of the work vehicle, includes data for the display 115 to display run screens and organizes run screens according to sets, as will be described in further detail below.

The processor 120 includes a shortcut manager 121, emulator 122 and run screen manager 123. The shortcut manager 121 manages the shortcut abilities of the display 115 such as the shortcut bar 116. The emulator 122 emulates other buttons on the display 115 that were conventionally represented by physical controls. With the shortcut manager 121, the emulator 122 emulates replaced user physical controls. The run screen manager 123 retrieves run screens and sets of run screens based on an action of the user. Moreover, the run screen manager 123 organizes the run screen modules into sets. The sets of run screen modules may be dictated by a user's selection and/or programmed by a manufacturer of the display system 105.

The display 115 may be a touch screen display with a user interface 117. The user interface 117 may act as a touch controller. The user interface 117 may communicate the actions of the user (e.g., touch) to the processor 120 through the data bus 112. While actions by the user are often described as touching, it should be understood that the user interface 117 may operate based on voice commands and/or other objects (e.g., stylus) touching the display. Moreover, other possible gestures include double tap, drag/slide, flick, nudge, pinch and spread. The display 115 displays the shortcut bar, status indicator 118 and run screen 119, as is illustrated in FIGS. 2A-3B.

Run Pages

The terms run pages, run screens and dashboards may be used interchangeably.

At least one example embodiment discloses an edit run page set overlay. The edit run page set overlay may include design components for editing a current run page set. The edit run page set overlay gives the user the ability to change the name of the current run page set and to add, remove, and reorder pages within the run page set.

A run screen provides a dedicated functionality or set of functions for a machine, such as planting, tilling, harvesting, spraying or another agricultural or other work task. Further, the run screen may provide diagnostics, or status messages on different components, systems, or the vehicle, or its implements (attached or operable connected to the vehicle).

Run screens are customizable with modular content for the display of vehicle status and control information. Run screens have custom user-programmable controls (e.g., guidance control) for vehicle components, systems or features that previously required separate physical controls (e.g., joystick, dials, levers, knobs or switches). Advantageously, the vehicle manufacturer does not need to provide physical controls for less popular or seldom ordered options on vehicles (e.g., front power take-off shaft on a tractor) because the display system can be customized to produce data messages that emulate such physical controls in communication with the vehicle data bus 210 (e.g., CAN data bus or ISO data bus).

The user may reprogram the vehicle to only have controls (icon buttons on the toolbar) that are relevant to a task at hand and the particular version of the vehicle, for a particular user, or for a particular season (e.g., harvesting buttons may be temporarily deleted for Spring planting, Fall Run screens can be optimized for harvesting, planting winter wheat or tillage; Spring Run Screens can be adjusted for tillage, fertilizing or planting; Summer Run Screens can be optimized for spraying).

Figure 2A:
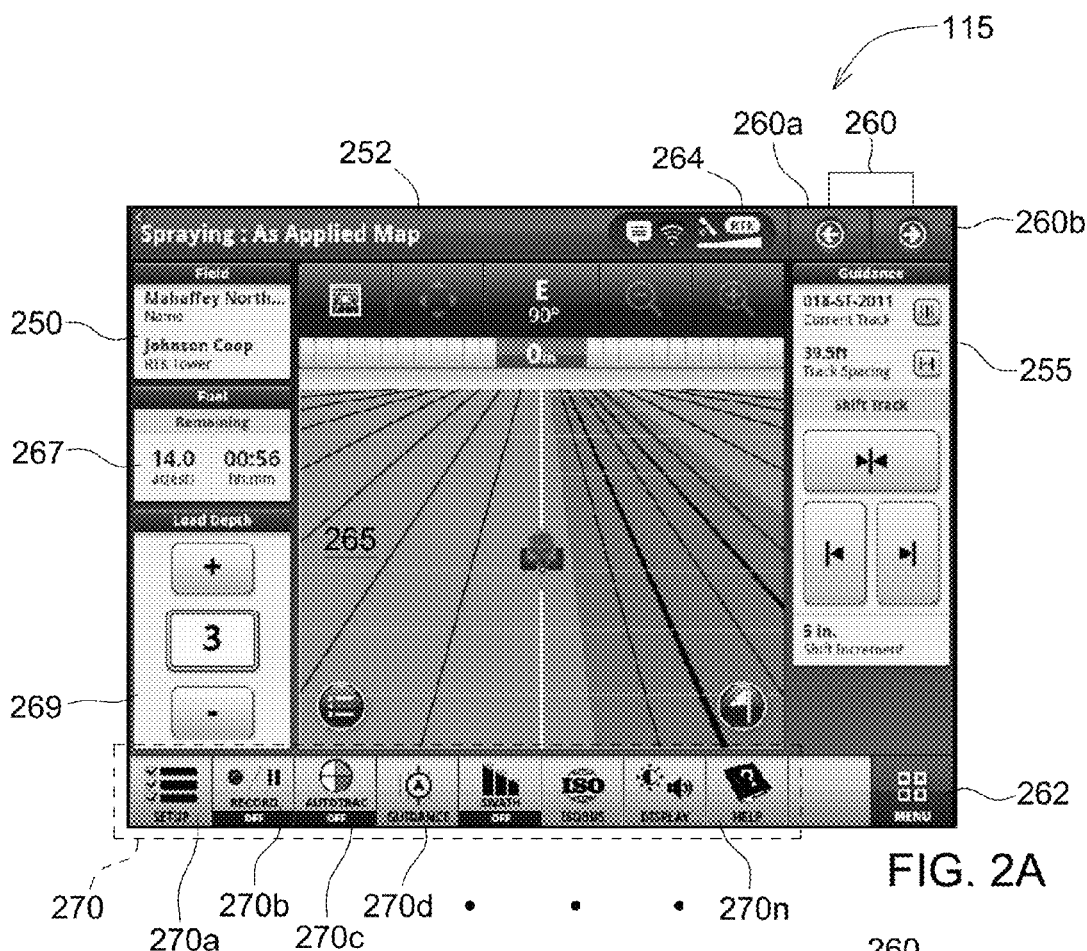
FIGS. 2A-2B illustrate a set of run pages for ten inch screen according to an example embodiment.
Figure 2B:
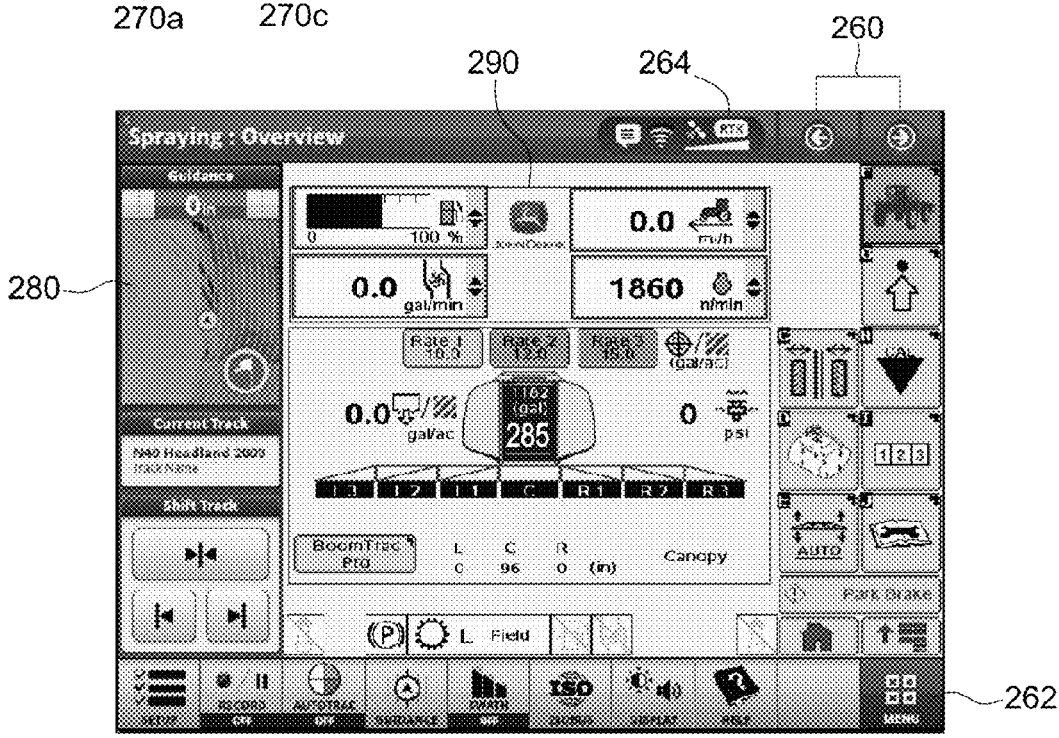
Figure 3A:
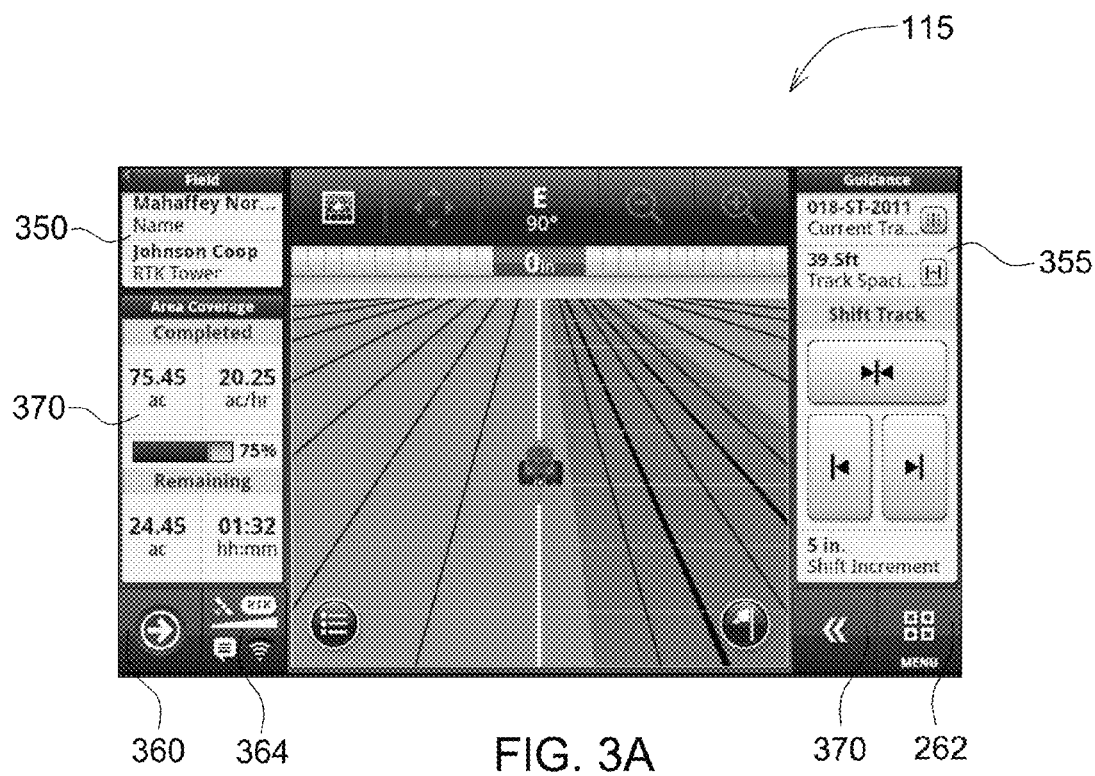
FIGS. 3A-3B illustrate a set of run pages for seven inch screen according to an example embodiment.
Figure 3B:
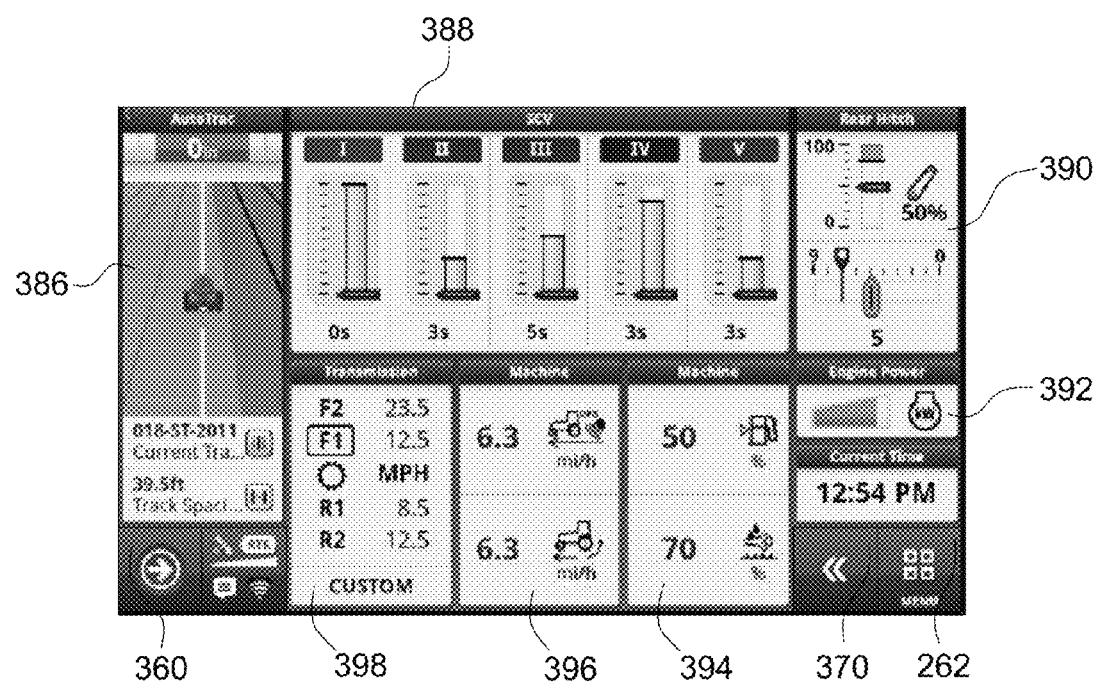

FIGS. 2A-2B illustrate a set of run pages for a ten inch screen according to an example embodiment. FIGS. 3A-3B illustrate a set of run pages for a seven inch screen according to an example embodiment.

In FIG. 2A, a first run page for spraying is displayed on the display 115. In FIG. 2B, a second run page for spraying is displayed on the display 115. Edit page sets may be created by the run screen manager 123. Each edit run page set may be associated with a function and/or user. Example functions include planting, a spraying, and a harvesting.

The run screen manager 123 is configured to establish the set of run screens in a temporal sequence for performing seasonal operations in an agricultural field.

Moreover, a set of run pages may include a Spring run page, a Summer run page and a Fall run page, wherein each run page is associated with one or more seasonal work tasks in the foregoing sequential order of display.

In an example embodiment, the first and second run pages are selected by the user from a list consistent with a vehicle profile of the vehicle. In an example embodiment, the list is stored in the data storage device 125 associated with the display 115. In another example embodiment, includes accessing the list is accessed via one of the vehicle data bus 210 and the data bus 112 (ISO data bus).

In an example embodiment, the first and second run pages are selected by the user from a list consistent with an implement profile for the vehicle. In an example embodiment, the implement profile is stored in the data storage device 125 associated with the display 115. In another example embodiment, the list is accessed via one of the vehicle data bus 210 and data bus 112 (ISO data bus).

In an example embodiment, the first and second run pages are selected by the user from a list consistent with a user profile of the vehicle. In an example embodiment, the user profile is stored in the data storage device 125 associated with the display 115. In another example embodiment, includes accessing the list is accessed via one of the vehicle data bus 210 and data bus 112 (ISO data bus). The user profiles can be programmed to change with the seasons, such as having a Fall Run Screen, a Winter Run Screen and a Spring Run Screen and a Summer Run Screen.

In FIGS. 2A-2B, the user interface 117 produces a toggle 260 so a user may toggle between run pages in the set of run pages. The toggle 260 includes a right navigation button 260b and a left navigation button 260a. The user touches the right navigation button 260b to go to a next run page in the set. The taps the left navigation button 260a to a previous run page in the set. Since the run pages shown in FIGS. 2A-2B are both directed to spraying the run pages may be in the same set.

Additionally, the user interface produces a short cut bar 270. The short cut bar 270 includes one or more transient user-definable buttons 270a-270n on the short cut bar 270. The buttons 270a-270n may be programmed by a manufacturer and then altered by the user. The short cut bar 270 is described in greater detail below.

The button 270a opens an application for setting up a field operation by selecting vehicle, implement, field, and crop. The button 270b indicates the state of field operation recording and allows the operator to manually toggling the recording state on and off. The button 270c indicates the state of the automatic guidance system and allows the operator to toggle activation on and off. The button 270d opens the automatic guidance application. The button 270e indicates the state of the automatic section control and opens the application for changing settings for automatic section control. The button 270f opens a ISO 11783 part 6 virtual terminal application. The button 270g opens the application that allows adjustment of display brightness and speaker volume. The button 270n opens an on-line help application.

FIG. 2A illustrates a run page for spraying as applied produced by the user interface 117. As shown, the user interface 117 produces a title text area 252 and an identifier 250 for the field where the vehicle is present. Moreover, the display 115 shown in FIG. 2A includes a guidance portion 255 which illustrates the current track and track spacing. The user interface 117 produces a map portion 265 which illustrates the path of the vehicle.

In addition, the run page includes sections for fuel 267 and load depth 269.

It should be understood, that the user interface 117 produces the field identifier 250, the guidance portion 255 and the sections for fuel 267 and load depth 269 by the user selecting the field identifier 250, the guidance portion 255 and the sections for fuel 267 and load depth 269 as parts of the run page for spraying. The operator may select different components to occupy the run page, including the option of leaving some areas unpopulated. The system ships with a standard set of run pages designed to serve as a starting point for this customization.

FIG. 2B illustrates a run page for spraying overview produced by the user interface 117. As shown in FIG. 2B the user interface 117 produces a guidance section 280. The guidance section 280 provides an overview of the current track and map of the vehicle. The user interface 117 also includes an operating overview section 290 which displays an amount of fuel remaining, a speed of the vehicle and amount of fuel used per amount of time, for example.

A section 285, including buttons 272 is an ISO 11783 part 6 virtual terminal application. A square central area of 480×480 pixels is a data region, while the area encompassing buttons 272 is a soft key region.

Multiple run pages may be grouped together into a run page set. Because both displays in FIGS. 2A-2B illustrate spraying run pages, a user may group the spraying run pages into a run page set. Editing run page sets is described in further detail below. A user may select a run page by touching the title text area 252.

In FIGS. 3A-3B, the user interface 117 produces a toggle 360 so a user may toggle between run pages in the set of run pages. Additionally, the user interface produces a retractable short cut button 370. As will be further described below, the retractable short cut bar includes one or more transient user-definable buttons 270a-270n. The buttons may be programmed by a manufacturer and then altered by the user.

FIG. 3A illustrates a run page for spraying as applied produced by the user interface 117. As shown, the user interface 117 produces an identifier 350 for the field where the vehicle is present. Moreover, the display 115 shown in FIG. 3A includes a guidance portion 355, which illustrates the current track and track spacing. The user interface 117 also produces a map portion 365 which illustrates the path of the vehicle and a coverage overview 370. The map portion 365 may be 480×480 pixels.

It should be understood, that the user interface 117 produces the field identifier 350, the guidance portion 355 and the coverage overview 370 by the user selecting the field identifier 350, the guidance portion 355 and the coverage overview 370 as parts of the run page for spraying. Alternatively, the run page may be established by the manufacturer.

FIG. 3B illustrates a run page for spraying overview produced by the user interface 117. Section 386 illustrates a condensed guidance view. Section 388 illustrates a module displaying the status of the hydraulic control valves. Pressing any of the vertical bars (I-V) will allow the user to set the flow rate and duration for that valve. Section 390 illustrates a rear hitch position and settings. Section 392 illustrates engine power as a function of full power. Sections 394 and 396 show a value of machine parameters, including radar speed, wheel speed, fuel level and diesel exhaust fluid (DEF) level. Section 398 illustrates a speed for each field cruise setting.

Because both displays in FIGS. 3A-3B illustrate spraying run pages, a user may group the spraying run pages into a run page set. A user may navigate through the run page set by pressing the navigation button 360.

As shown in FIGS. 2A-3B, the user interface 117 also produces a menu button 262. When a user touches the menu button 262, the user interface launches a menu stored in the data storage device 125 on the display 115. The menu may include a list of applications to select such as guidance, reports work performed, vehicle monitoring and ISO (International Organization for Standardization) virtual terminal.

The user interface 117 is also configured to produce a status information bar 264 and 364 in FIGS. 2A-2B and 3A-3B, respectively. When a user touches one of the status information bars 264 and 364, the user interface 117 launches a status center stored in the data storage device 125. The status center stores data regarding messages, software downloaded and network connections, such a Wi-Fi.

By using the user interface 117, a user may create, edit or delete a run page; create, edit or delete a run page set; select a run page/run page set to view; navigate through a run page set, access a menu, and view status information.

By exchanging information with the user interface 117, the processor 120 is configured to establish a first run screen associated with a first function of a work vehicle and establish a second run screen associated with a second function of the work vehicle distinct from the first function and define an order of appearance of the first run screen and the second run screen within a set of run screens that allows a user to select a run screen in the set of run screens that are displayable in accordance with the defined order.

In example embodiment, the order of appearance is a user-definable sequence.

In example embodiment, the defining defines the order of appearance such that the order permits the user to toggle through the set of run screens.

In example embodiment, the run screen manager 123 may select a run page to delete from the set of run screens based on the user using the user interface 117.

In example embodiment, the run screen manager 123 may add a third run screen in any position within the set to change the order of appearance of run screens within the set based on the user using the user interface 117. The run screen manager 123 may change the order of the appearance of the run screens within the set.

Retractable Toolbar

A retractable shortcut bar may be a component located at a bottom of a screen. The retractable shortcut bar serves as a container for shortcut buttons serving various user interface functions. The shortcut bar allows one-touch access to commonly used functions of the vehicle. The retractable shortcut bar allows for a display of state indicators and system toggles. The retractable shortcut bar allows for access to low-take-rate vehicle and implement features without the costs and clutter of physical buttons.

In an example embodiment, the retracting feature allows the shortcut bar to remain hidden, permitting use of a 480×480 pixel map module or a full 480×480 pixel ISO 11783 part 6 virtual terminal.

As shown, in FIGS. 2A-2B, the shortcut bar 270 may be at the bottom of the display 115 in an example embodiment.

In an example embodiment, such as the seven inch screen shown in FIGS. 3A-3B, a shortcut bar may be retractable. The terms, toolbar and shortcut bar, may be used interchangeably.

Figure 4A:
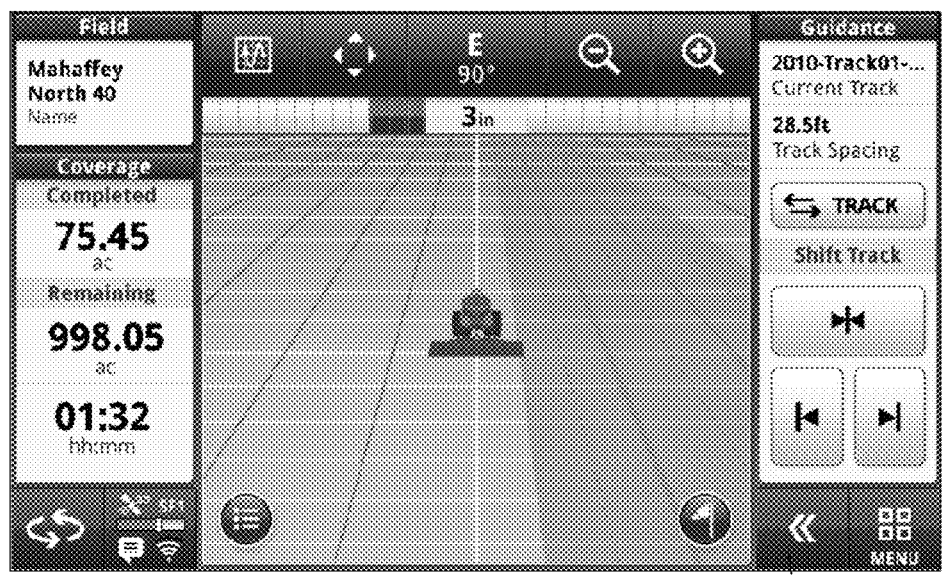
FIG. 4A illustrates an example embodiment of a screen with a shortcut bar retracted.
Figure 4B:
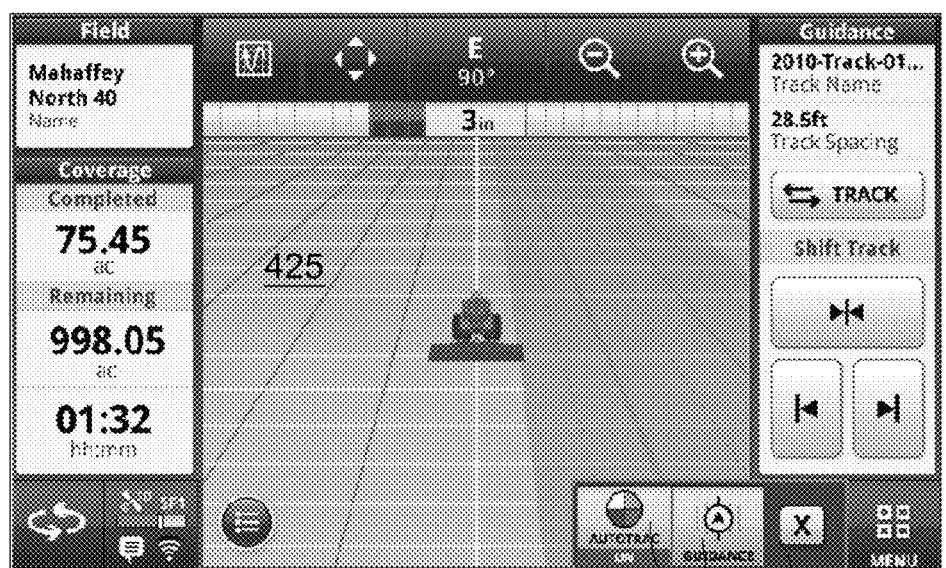
FIGS. 4B-4C illustrate example embodiments of a screen with a shortcut bar extended.
Figure 4C:
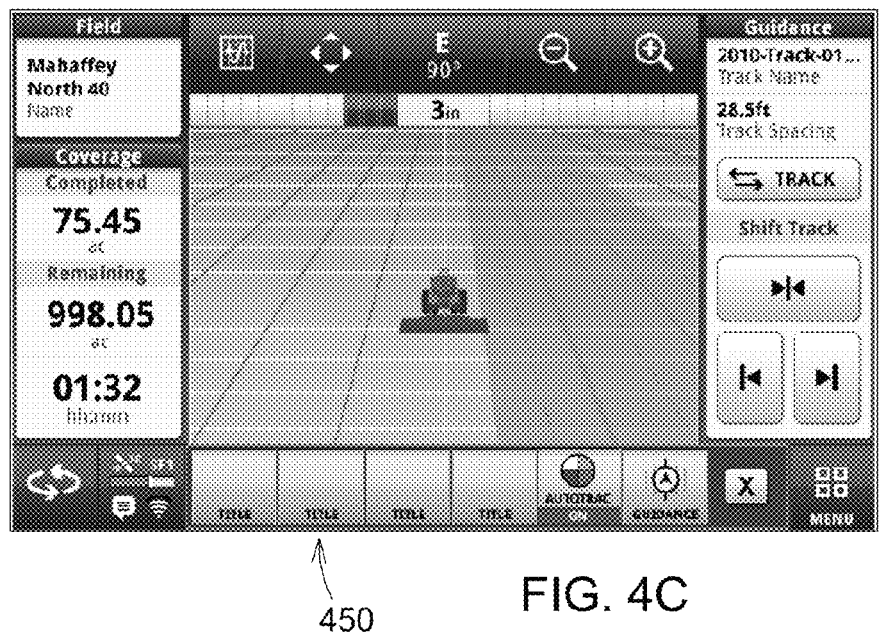

FIG. 4A illustrates an example embodiment of a screen with the shortcut bar retracted and FIGS. 4B-4C illustrate example embodiments of the screen with the shortcut bar extended.

FIG. 4A illustrates a run page with a shortcut button 410. As shown in FIG. 4A, a shortcut bar is not extended.

FIG. 4B illustrates a shortcut bar 412 extended with two definable buttons for tracking a vehicle's movement 415 and for GPS guidance along a route 420. As shown, the shortcut bar 412 extends into a portion (e.g., first portion) of display area 425. The display area 425 may be defined by a standard. For example, the display area 425 may be a reserved area of 480 pixels by 480 pixels (e.g., second portion), which is defined by ISO. Consequently, the shortcut bar 412 extends over a portion of the reserved area.

The shortcut bar 412 becomes extended upon the user pressing the shortcut button 410. Based on the user's action, the user interface 117 communicates with the processor 120 to access the shortcut manager 121. The processor provides the user interface 117 with the data regarding the shortcut bar 412, such as the buttons within the shortcut bar 412. As shown, when the shortcut bar 412 becomes extended, an "X" icon appears. By a user pressing the "X", the user interface 117 retracts the shortcut bar 412. Additionally or alternatively, the shortcut bar 412 disappears after a timer initiated at the time of deployment expires such that the second portion of the run screen is displayed.

FIG. 4C illustrates an example embodiment showing a shortcut bar 450 with six definable buttons.

The processor 120 is configured to establish a run screen on the touch screen display 115 that is associated with a function of a work vehicle. The processor 120 instructs the user interface 117 to configure the run screen with a retractable toolbar. The retractable toolbar is deployed by the user interface in response to an action of a user of the touch screen display and deployable over a first portion of the run screen upon the action of the user and otherwise hides to display a second portion of the run screen, the second portion of the run screen being at least a majority portion of the run screen.

As described in further detail below, the definable buttons may be programmed initially by the manufacturer and/or selected by the user. The buttons on the retractable toolbar 412 are associated with at least one of the function and the run screen.

The processor is configured to allocate high priority status data associated with the function to a region other than the first portion of the run screen and allocate lower priority status data associated with the function to first portion of the run screen. Consequently, the high priority status data is not covered by the shortcut bar 412 is extended.

The user-definable buttons may be selected by the user and/or processor 120 from at least one of a list and a menu based on status data displayed on the run screen.

The user-definable buttons may be selected by the user and/or processor 120 from a list of options that are consistent with a vehicle profile of the vehicle. The vehicle profile may be stored in the data storage device 125 associated with the display.

The processor 120 may access the list of options through the vehicle data bus 210 and/or the data bus 112.

The user-definable buttons may be selected by the user and/or processor 120 from a list of options consistent with the profile of the user.

A run screen provides a dedicated functionality or set of functions for a machine, such as planting, tilling, harvesting, spraying or another agricultural or other work task. Further, the run screen may provide diagnostics, or status messages on different components, systems, or the vehicle, or its implements (attached or operable connected to the vehicle).

As described, when a user touches, taps, selects or activates the shortcut button 410, the toolbar is deployed with one or more user-definable buttons. The toolbar can be set to disappear after the expiration of timer or only when closed by a user (e.g., by touching, tapping, selecting or activating a close "X" symbol). When the shortcut bar 412 is inactive, the user can enjoy the full screen to display other information.

The user may use the toolbar or program it with links to custom user-programmable controls (e.g., run screens) for vehicle components, systems or features that previously required separate physical controls (e.g., joystick, dials, levers, knobs or switches). Advantageously, the vehicle manufacturer does not need to provide physical controls for less popular or seldom ordered options on vehicles (e.g., front power take-off shaft on a tractor) because the display system 105 can be customized to produce data messages that emulate such physical controls in communication with the vehicle data bus (e.g., CAN data bus or ISO data bus).

Status Shortcut

The status shortcut is a component that may be located on a shortcut bar. The status shortcut allows an operator to observe and/or toggle a status of an application feature without opening the application. The status shortcut may be added to the shortcut bar by a user.

The user interface 117 in conjunction with the processor 120 is configured to display buttons that provides both a status of a function and control of the function.

FIGS. 5A-5E illustrate an example embodiment of a status shortcut button that may be used in the shortcut bar 270 and the retractable shortcut bar 412. FIGS. 5A-5E illustrate various statuses of a guidance system, which is provided as button 270c in FIG. 2A. The user interface 117 adjusts the status of the buttons based on commands from the processor 120. The processor 120 is configured to monitor that status of various functions of the vehicle through the communications interface 110, as described above.

Figure 5A:
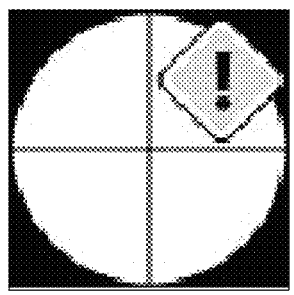
FIGS. 5A-5E illustrate an example embodiment of a status shortcut button.

FIG. 5A illustrates the status of the guidance system, when the guidance system is not installed. The icon in FIG. 5A is shown by the user interface 117 in the shortcut bar when the guidance system is installed in a system of the vehicle.

Figure 5B:
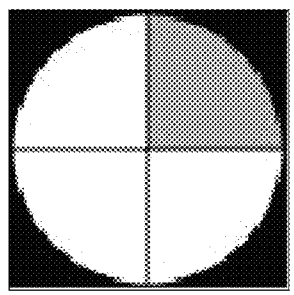

FIG. 5B illustrates the status of the guidance system, when the guidance system is installed. The icon in FIG. 5B is shown by the user interface 117 in the shortcut bar when the guidance system is installed in a system of the vehicle.

Figure 5C:
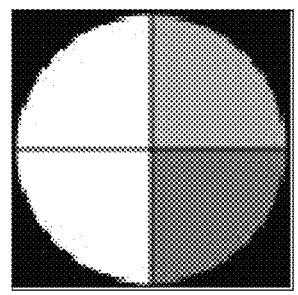

FIG. 5C illustrates the status of the guidance system, when the guidance system is configured. The icon in FIG. 5C is shown by the user interface 117 in the shortcut bar when the guidance system is setup in the system of the vehicle. This includes specific routes, guidance the vehicle is to follow and/or spacing the vehicle is to follow, for example.

Figure 5D:
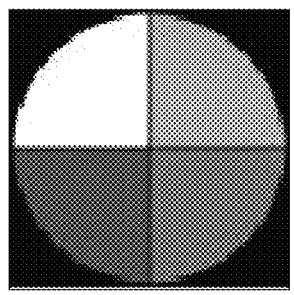

FIG. 5D illustrates the status of the guidance system, when the guidance system is enabled. The guidance system is enabled when inputs are made and the guidance system may be activated by pushing the button 270c.

Figure 5E:
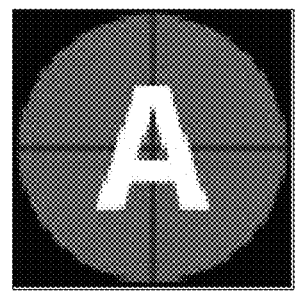

FIG. 5E illustrates the status of the guidance system, when the guidance system is activated. The icon in FIG. 5E indicates that the guidance system is in use. The user interface 117 shows the icon in FIG. 5E until the user deactivates the guidance system, touches the steering wheel or other conditions (e.g., out of seat, off GPS path, etc.). For example, the user interface 117 may transition from the icon shown in FIG. 5E to the icon shown in FIG. 5D when the user pushes the button 270c to disengage the guidance system.

In an example embodiment, a different icon may be displayed if the guidance system is off.

The icons of FIGS. 5A-5E may transition in response to a status message data provided by the location-determining receiver 240 and the guidance system 230.

In addition to the guidance system 230, icons may represent the status of at least one of planting, plowing, spraying and harvesting.

The processor 120 is configured to establish a run screen associated with a first function of a vehicle, provide a location-determining receiver for potential guidance of the work vehicle, establish a plurality of performance states associated with at least one of the location-determining receiver and a guidance controller and display one or more of the performance states by corresponding visually displayable states without changing to another screen of the display.

The processor 120 may issue a call from the display system 105 to the guidance system 230, wherein the transition of the icon occurs in response to data transmitted from the guidance system 230 in reply to the call.

In an example embodiment, the guidance system 230 is one of (1) continuously active in a background data processing of the display system and (2) loaded into the data storage device 125 for the data processor.

The location-determining receiver 240 is coupled directly or indirectly to the vehicle data bus 210 to support communications with the display system 105. The display system 105 can run multiple applications in the background and may use any suitable windowing operating system. For the guidance system 230 shortcut status, the status can be retrieved and displayed in the button (e.g., 5 different states possible) on the shortcut bar 270 or 412. The status is displayed without displaying the entire guidance system 230 screen. A call regularly (e.g., after the expiration of a time interval) made to a guidance system software module, a guidance system program module or subroutine requests the update of status information for the shortcut button.

Figure 6:

Referring back to FIGS. 2A-2B and 3A-3B, when a user presses the menu button 262, the processor 120 retrieves the menu from the data storage device 125. The processor 120 then provides the display with the menu, which is shown in FIG. 6. As shown in FIG. 6, the user may select settings, applications, implements or system information to display. In FIG. 6, applications are selected for display.

By using the user interface 117, a user may select one of the applications being displayed. In an example embodiment, the user selects a dashboard layout manager application to may create, edit or delete a run page; create, edit or delete a run page set; select a run page/run page set to view; and navigate through a run page set.

When a user touches a dashboard layout manager 610, the user interface 117 provides the processor 120 with the user's selection. The run screen manager 123, within the processor 120, retrieves a layout manager application from the data storage 125. The processor 120 then provides the display 115 with a layout manager display, shown in FIG. 7A.

Figure 7A:
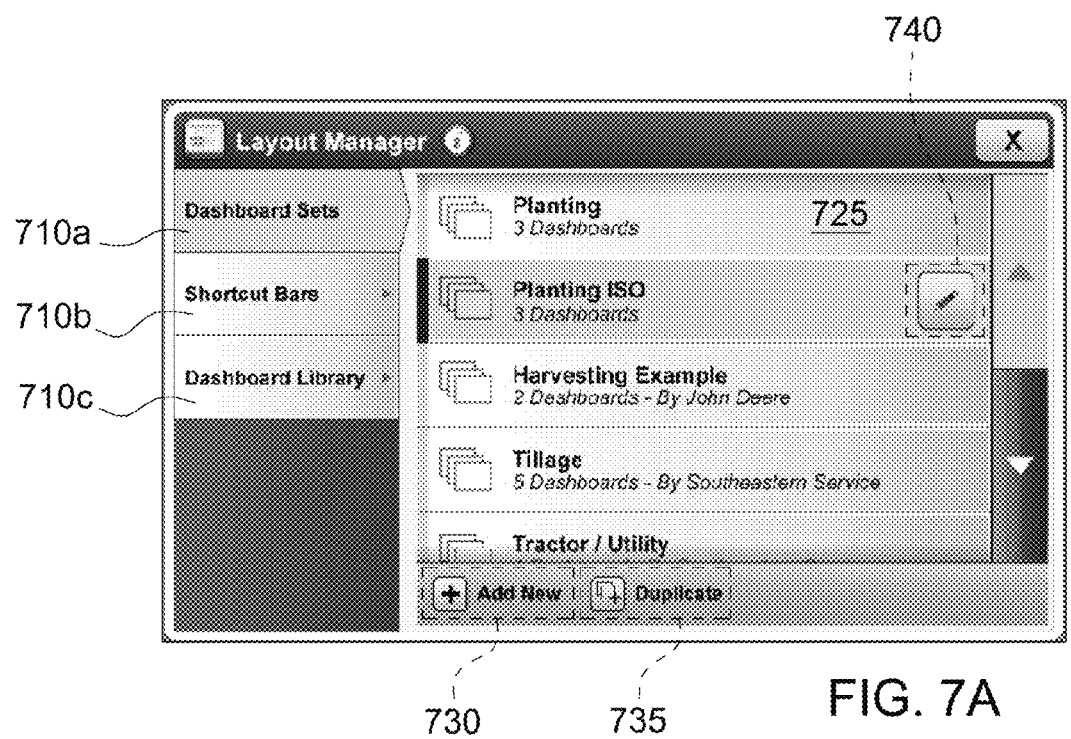
FIGS. 7A-7C illustrate a layout manager according to an example embodiment.
Figure 7B:
Figure 7C:

As shown in FIG. 7A, the user interface 117 provides the user the ability to select dashboard sets 710a, shortcut bars 710b or dashboard libraries 710c for display. FIG. 7A illustrates an embodiment where the dashboard sets are shown in a display area 725, FIG. 7B illustrates an embodiment with the short cut bars are shown in the display area 725 and FIG. 7C illustrates an embodiment with the dashboard library shown in the display area 725.

With the dashboard sets display shown in FIG. 7A, the user may add a new dashboard set by pressing a button 730, duplicate a dashboard set by pressing a button 735, or edit a dashboard set by pressing an edit button 740. The user interface 117 displays the edit button 740 when a user touches one of the dashboard sets displayed in the display area 725. If the user selects the edit button 740, the processor 120 retrieves an edit dashboard set overlay shown in FIG. 9A. The editing of a dashboard is also described in greater detail below, with reference to FIGS. 10A-10J.

Figure 9A:
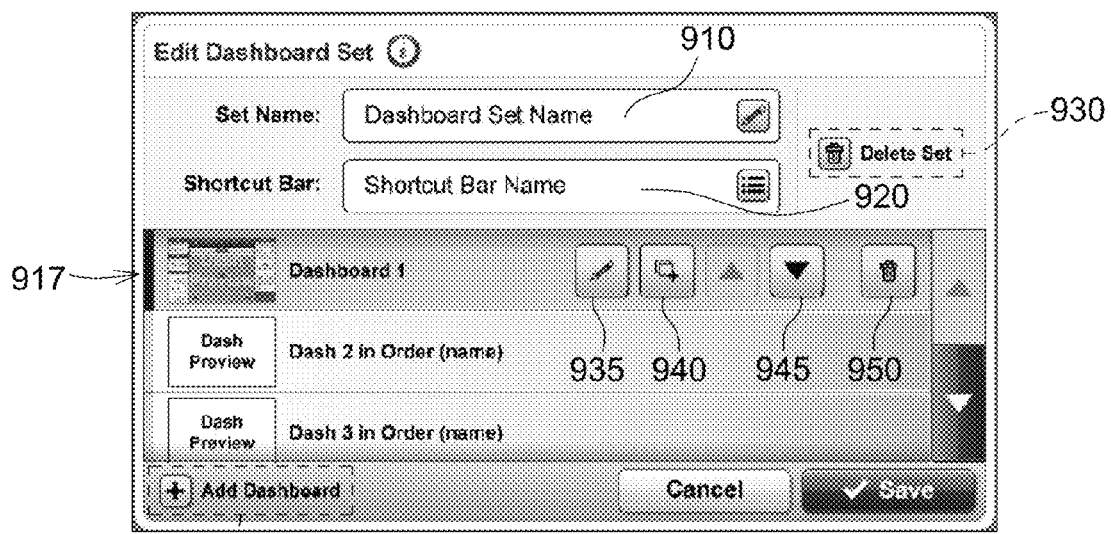
FIGS. 9A-9C illustrate run page set displays according to an example embodiment.
Figure 9B:
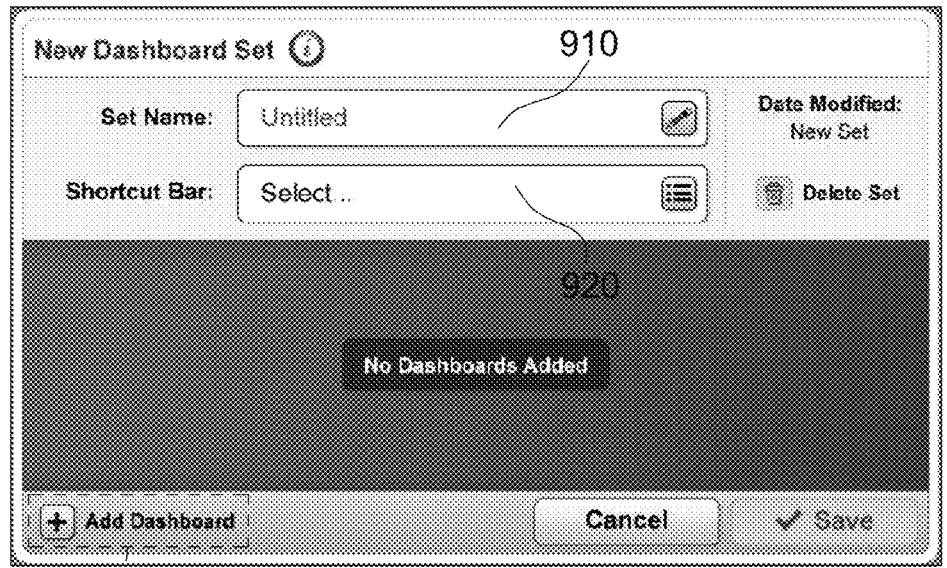
Figure 9C:

When a user selects to add a new dashboard set, the user interface 117 provides the processor 120 with the user's selection. The processor 120 retrieves the dashboard set management overlay and provides the dashboard set management overlay to the user interface 117, which is illustrated in FIGS. 9A-9C. The selection of the button 730, causes the display 115 to display the screen shown in FIG. 9B.

When a user selects to duplicate a dashboard set, the user interface 117 provides the processor 120 with the user's selection. The selection of the button 735 causes the processor 120 to provided data to the display to display the screen shown in FIG. 9C.

FIGS. 9A-9C are described in greater detail below.

Referring back to FIG. 2A, when a user presses the title text area 252, the processor 120 retrieves select dashboard data from the data storage device 125. The processor 120 then provides the display 115 with the select dashboard data, which is shown in FIG. 8.

Figure 8:
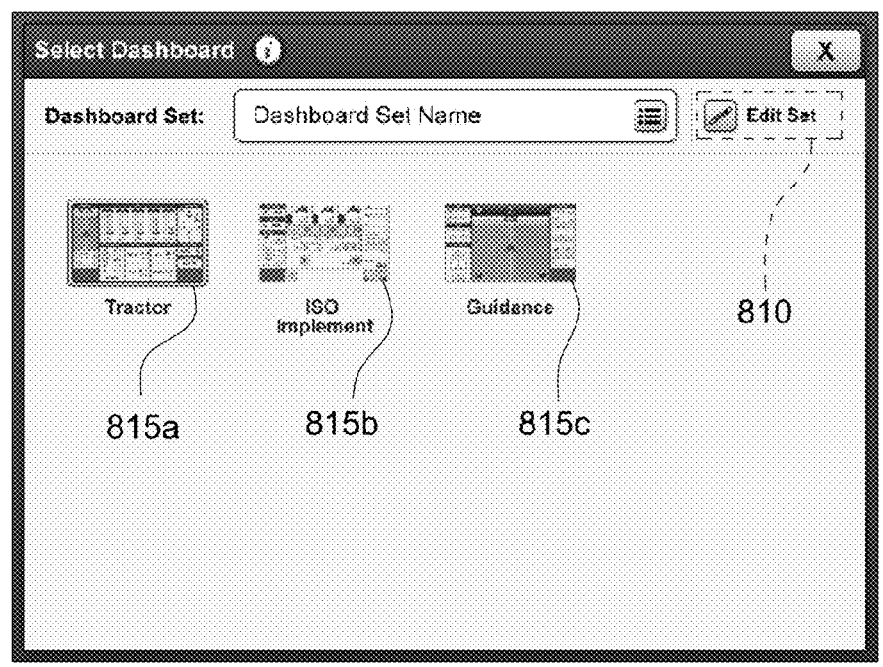

As shown in FIG. 8, the user may select may select a dashboard within the run page set. The run page set is identified in area 810 and a user may select one of the run pages 815a, 815b and 815c that are displayed by the display 115. By tapping one of the run pages 815a, 815b and 815c, the user interface 117 provides the processor 120 with the user's selection. This causes the processor 120 to retrieve the selected run page and provide the selected run page to the display 115. If the user selects an edit button 810 (e.g., by touching), the user interface 117 provides the processor 120 with the user's selection. This causes the processor 120 to retrieve the dashboard set management overlay, which is illustrated in FIGS. 9A-9C. The selection of the button 810, causes the display 115 to display the screen shown in FIG. 9A.

As shown in FIG. 9A, a user may edit the dashboard set name by touching area 910, select a shortcut bar to use with dashboard set by touching area 920, edit, add, duplicate, remove or reorder the dashboards. The processor 120 removes the dashboard set from the data storage device 125 when a user presses a delete button 930. When the user touches the touching area 920, the processor 120 is configured to provide the user with a list of shortcut bars the user may select for the dashboard set. Upon selecting a shortcut bar, the processor 120 assigns the selected shortcut bar to the dashboard set and the user interface 117 returns to the display in FIG. 9A.

When a user selects a dashboard from a list of dashboards 917, the user interface produces an edit button 935, a duplicate button 940, a reorder button 945 and a delete button 950. To add a dashboard to the dashboard set, the user presses button 955. Consequently, the user may add dashboards to a set according to factors such as season and job type, for example. The dashboards are saved in the data storage device 125.

The user may reorder the dashboards within the set by pressing the up/down arrows in the reorder button 945.

FIGS. 9B-9C illustrate similar functions as those shown in FIG. 9A except FIGS. 9B-9C are for new dashboard sets. Thus, for the sake of brevity, FIGS. 9B-9C will not be described in greater detail.

FIGS. 10A-10J illustrates an example embodiment of adding and editing a dashboard for a 7×7 display.

Figure 10A:
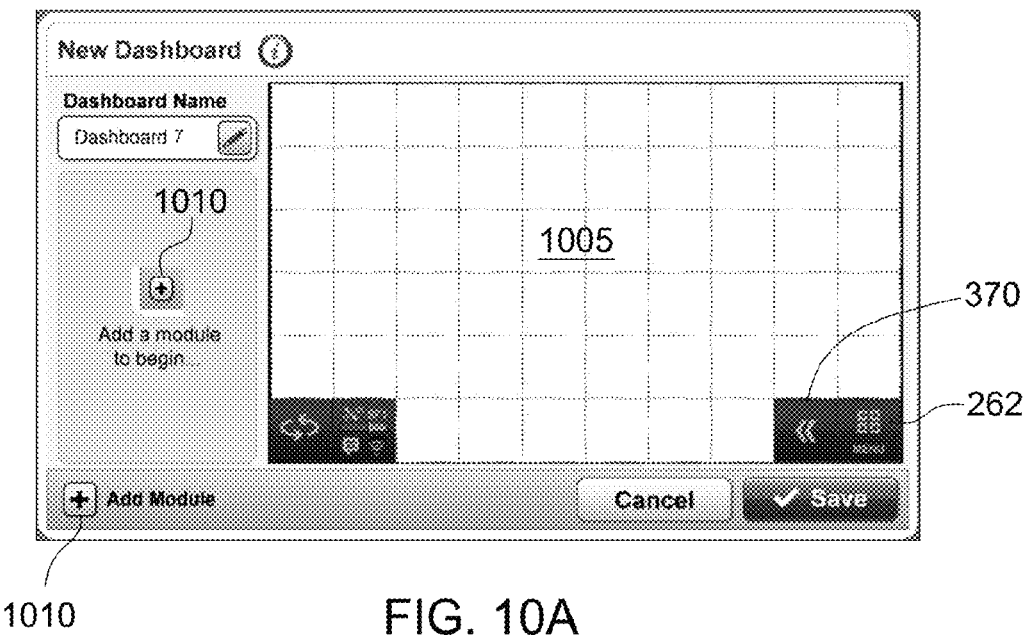
FIGS. 10A-10J illustrates an example embodiment of adding and editing a run page.

As described above, when a user selects to add a new dashboard, the user interface 117 via the processor 120, produces the display shown in FIG. 10A.

Figure 10B:
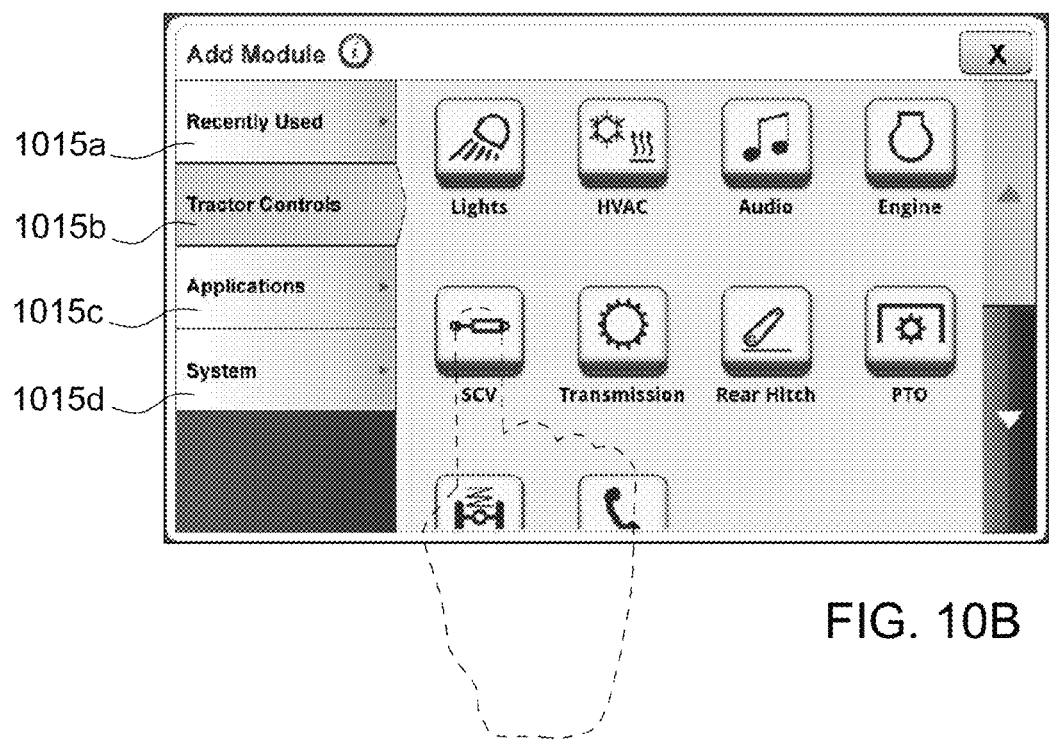

When creating a new dashboard, a module area 1005 is initially blank. The new dashboard includes the menu icon 262, the retractable shortcut button 370 and a save button 1002. When the user interface 117 senses that the save button 1002 has been touched, the processor 120 saves the dashboard. The processor 120 is configured to retrieve and add module overlay when the user selects the add module button 1010. The add module overlay is shown in FIG. 10B.

The user interface 117 produces tabs 1015a, 105b, 1015c and 1015d in the add module overlay to select among recently used modules, tractor controls, applications and system modules.

The recently used modules tab 1015a contains any dashboard module that have been added to or removed from a dashboard during a session. For example, a session may be a period of time from a last restart to a next restart. The contents of the recently used tab 1015a may be sorted with a most recently used dashboard module at the top.

A content area 1020 of each tab contains a title icon grid with icons for each type of dashboard module that is available within that category.

In the add module overlay shown in FIG. 10B, the user interface 117 displays a list of tractor controls in the content area 1020.

Figure 10C:
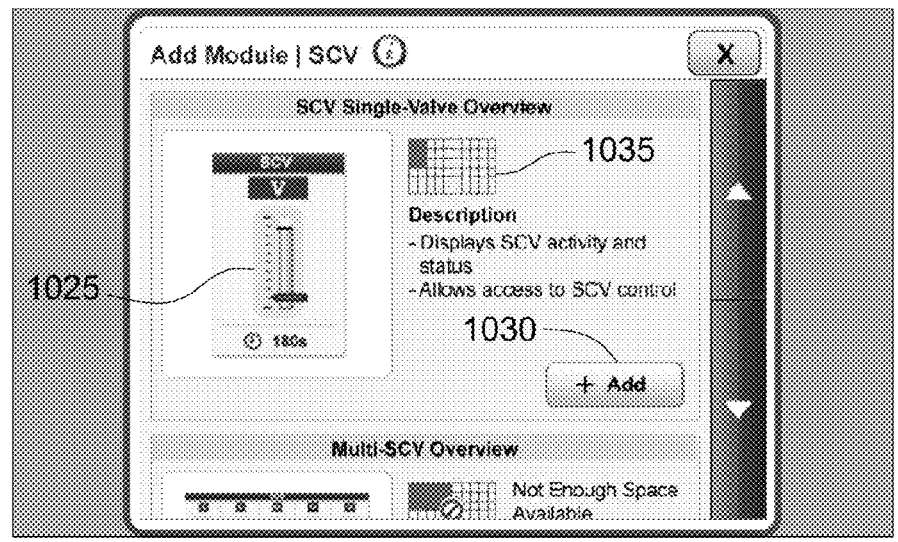

When a module is selected, the processor 120 retrieves an add module type overlay. FIG. 10C illustrates a module type overlay for a single-valve overview.

In FIG. 10C, the user interface 117 produces a picture of the dashboard module 1025, a graphic to show the size of the dashboard module 1030, a description of the elements within the dashboard module and an add button. The processor 120 determines what space the dashboard module may fit into the dashboard. If the dashboard module will not fit in any available space of the dashboard, the user interface 117 produces a message and icon with the module graphic to notify the user.

Figure 10D:
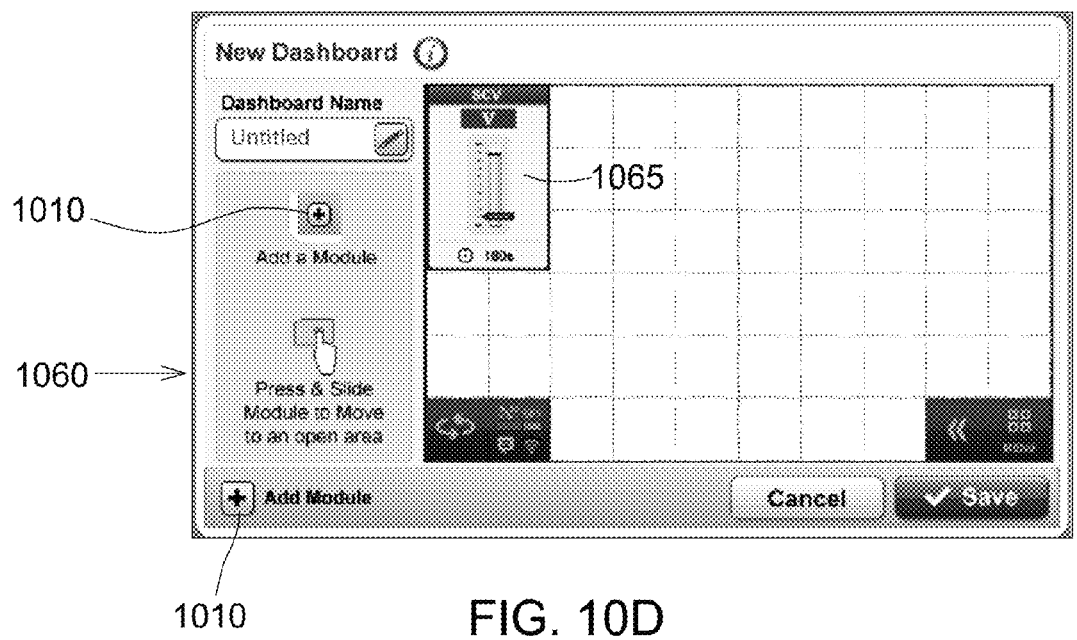

When the user selects the add button 1035, the processor 120 adds the selected module to the run screen by using the run screen manager 123 and returns to the new dashboard or edit dashboard overlay, as shown in FIG. 10D.

In FIG. 10D, the user interface 117 produces the new dashboard overlay with the selected module. Moreover, the user interface 117 provides the user with buttons for moving 1065 and adding a module 1010 in a message area frame 1060. To move a module 1065, the user may select the module 1065 by touching it. The user may move the module 1065 by dragging the module 1065 to a location within the area 1005.

Figure 10E:
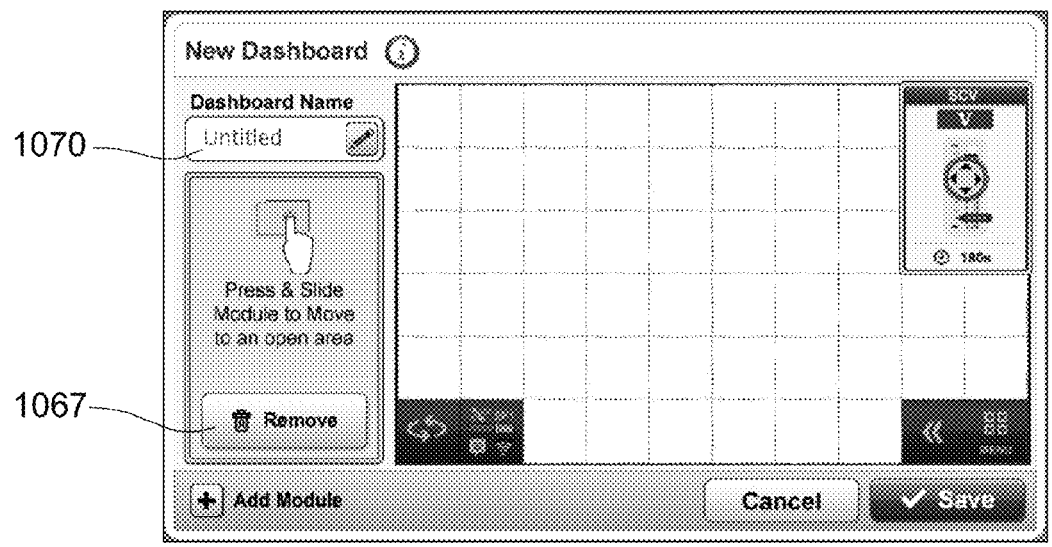
Figure 10F:
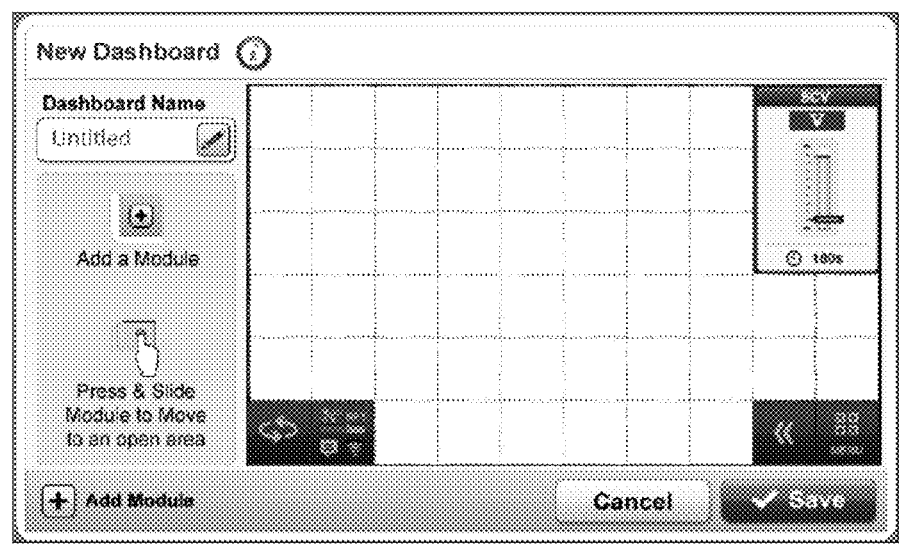

When the user has finished moving the module 1065, the user interface 117 changes the message area frame 1606 to include a remove button 1067, as shown in FIG. 10E. The user may also edit the dashboard name by entering a name in the dashboard name area 1070. To deselect the module 1065, the user touches the display 117 anywhere except on the module 1065, which returns the user interface to the user interface to FIG. 10F.

A user may continue the same process to add more dashboard modules until the module area 1005 is filled.

Figure 10G:
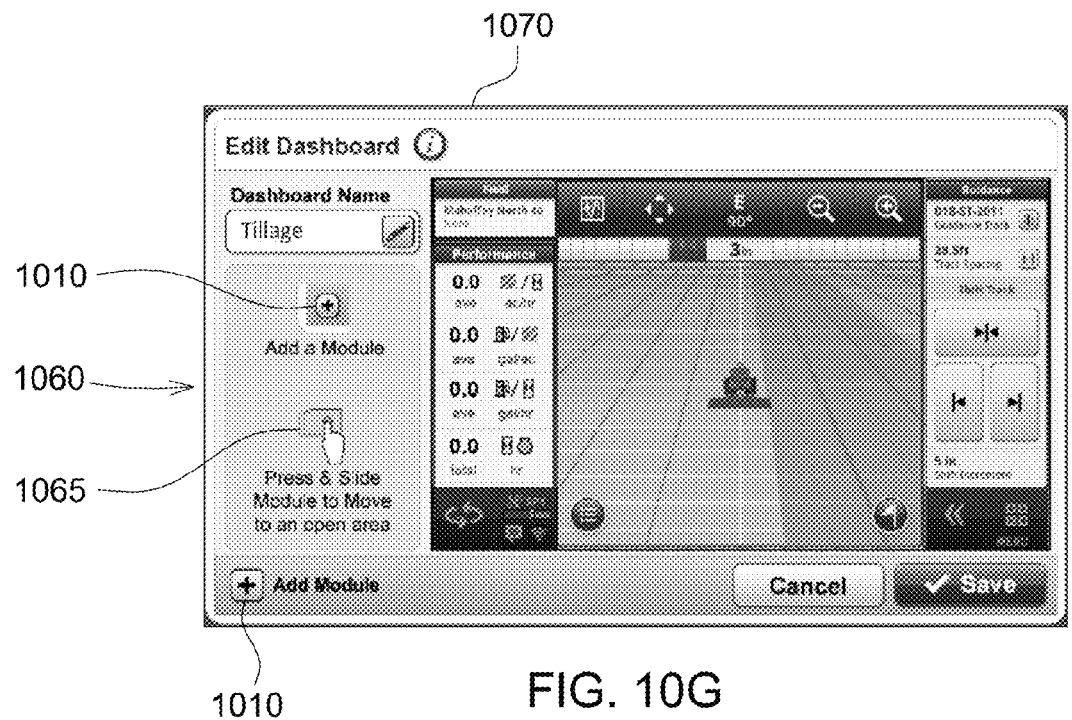

When the processor 120 senses that an edit dashboard button is selected, the processor 120 causes the user interface 117 to display an edit dashboard overly shown in FIG. 10G.

Figure 10H:
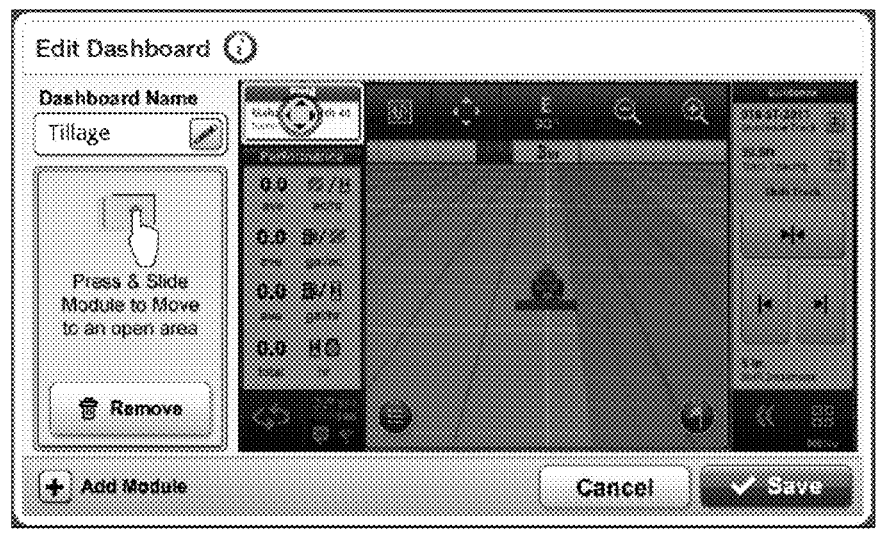
Figure 10I:
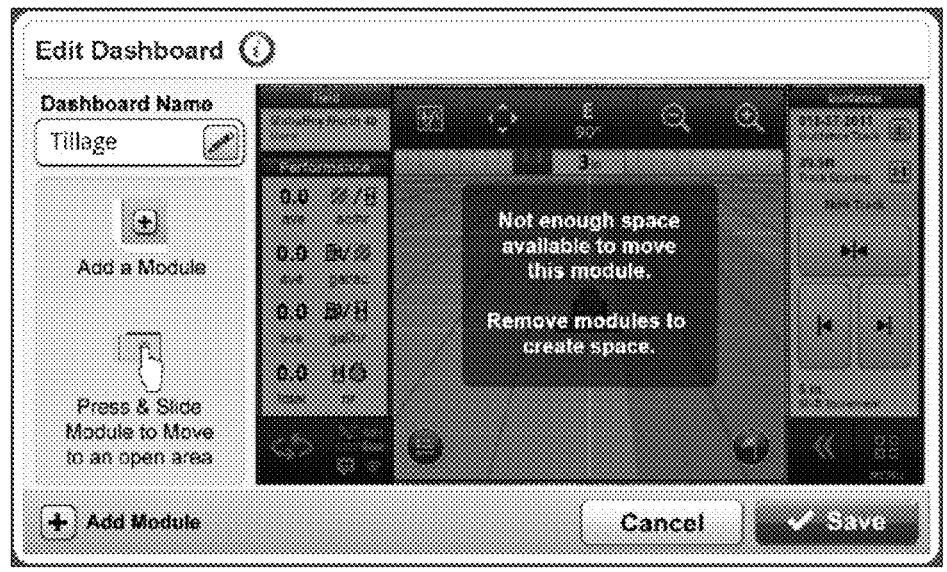

The user may select a dashboard module by touching the dashboard module. For example, the user may touch the field module 1070. By sensing the user's selection, the processor 120 provides data to and instructs the user interface 117 to allow the user to move or delete the selected field module 1070, as shown in FIG. 10H. If there is no space to move the selected module, the user interface notifies the user that no space is available, as shown in FIG. 10I.

Figure 10J:
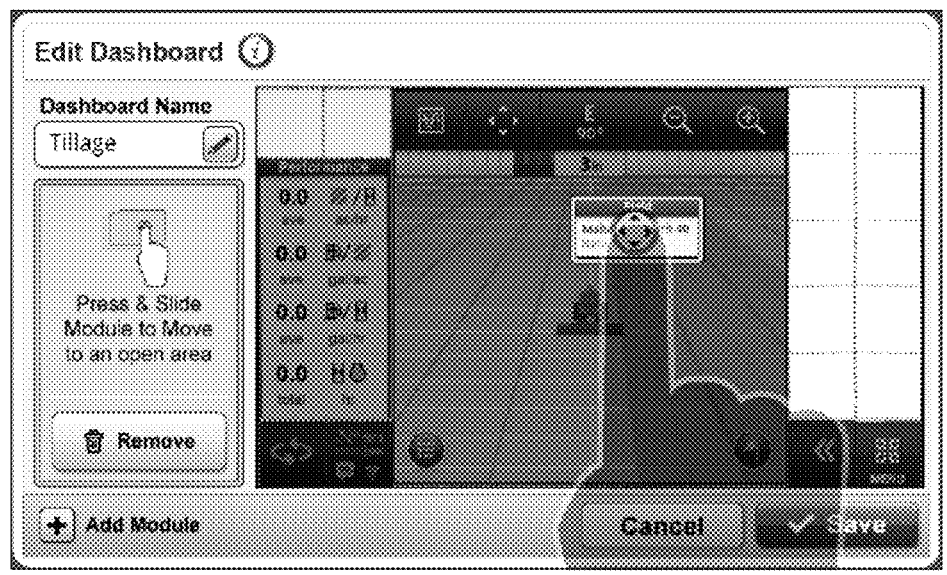

In FIG. 10J, a portion of the display is removed by the processor 120, which allows a user to move the field module 1070, when the field module 1070 is selected by the user. To deselect the field module 1070, the user taps anywhere on the dashboard except on the module 1070.

With the shortcut bars display shown in FIG. 7B, the user may add a new shortcut bar by pressing a button 745, duplicate a shortcut bar by pressing a button 750, or edit a shortcut bar set by pressing an edit button 760. The user interface 117 display the edit button 760 when a user touches one of the shortcut bars displayed in the display area 725. If the user selects the edit button 760, the processor 120 retrieves an edit shortcut bar overlay. The editing of a shortcut bar is described in greater detail below, with reference to FIGS. 11A-11E.

When a user selects to add a new shortcut bar or duplicate a shortcut bar, the user interface 117 provides the processor 120 with the user's selection.

Figure 11A:
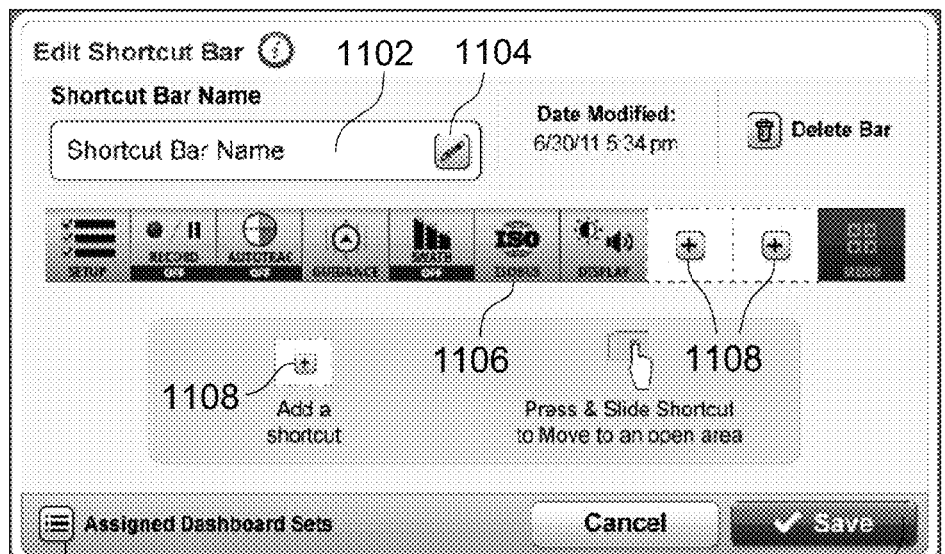

If the user selects a shortcut bar edit button, the processor 120 retrieves the edit shortcut bar overlay. FIG. 11A illustrates an example edit shortcut bar overlay.

As shown in FIG. 11A, the user interface 117 displays a name of the shortcut bar in area 1102. The shortcut bar name may be change by pressing the edit button 1104. The user interface 117 may display a keyboard for the user to use to change the name of the shortcut bar.

The user interface 117 also displays a graphic of the shortcut bar 1106. When a shortcut bar is not filled by shortcuts, empty spaces of the shortcut bar are displayed as add shortcut buttons 1108. Moreover, shortcuts within the shortcut bar 1106 may be moved in a similar manner as the dashboard modules. In other words the shortcuts within the shortcut bar 1106 may be moved by pressing and sliding the shortcut to an empty area of the shortcut bar.

The user interface 117 also illustrates an assigned dashboard sets button 1112. By a user pressing the assigned dashboard sets button 1112, the processor 120 permits the user to view and edit the dashboard sets where the shortcut bar is used.

The processor 120 saves the shortcut bar in the data storage 125 when a user presses a save button 1114. The shortcut manager 121 manages the storage of the shortcut bars.

Figure 11B:
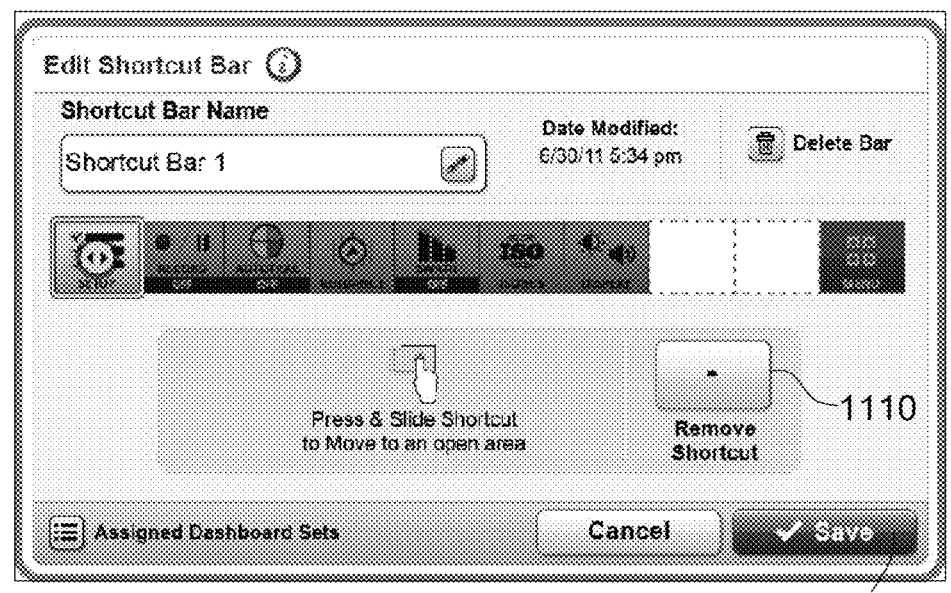

Moreover, by pressing a shortcut, the user interface 117 highlights the pressed shortcut and displays a remove shortcut button 1110, which permits a user to delete the shortcut from the shortcut bar, as shown in FIG. 11B.

Figure 11C:
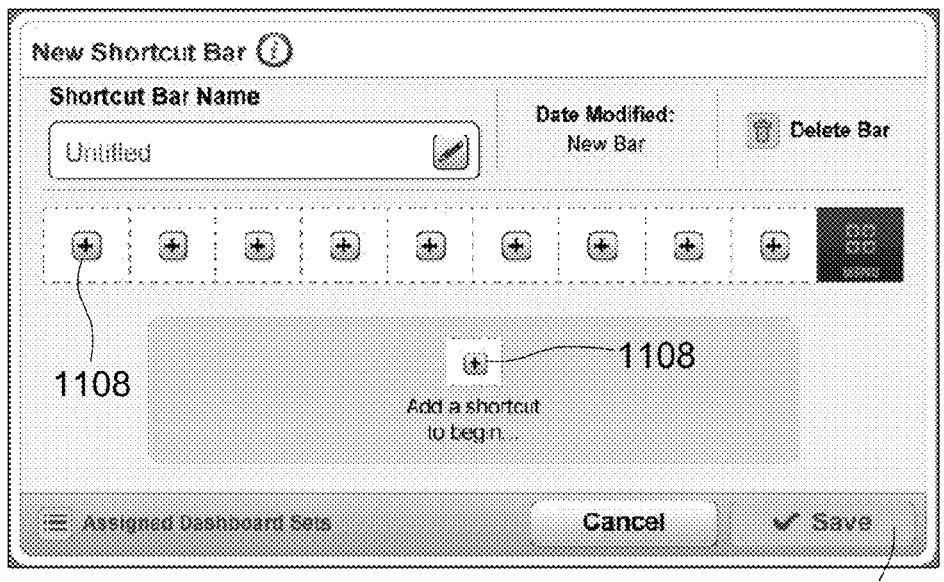

When a user selects to add a new shortcut bar, the user interface 117 provides the processor 120 with the user's selection. The processor 120 provides the user interface 117 with data to display a new shortcut bar overlay, as shown in FIG. 11C. The functionality of the user interface 117 with respect to the new shortcut bar overlay is the same as the functionality with respect to the edit shortcut bar overlay. Thus, for the sake of brevity, FIG. 11C will not be described in greater detail.

Figure 11D:
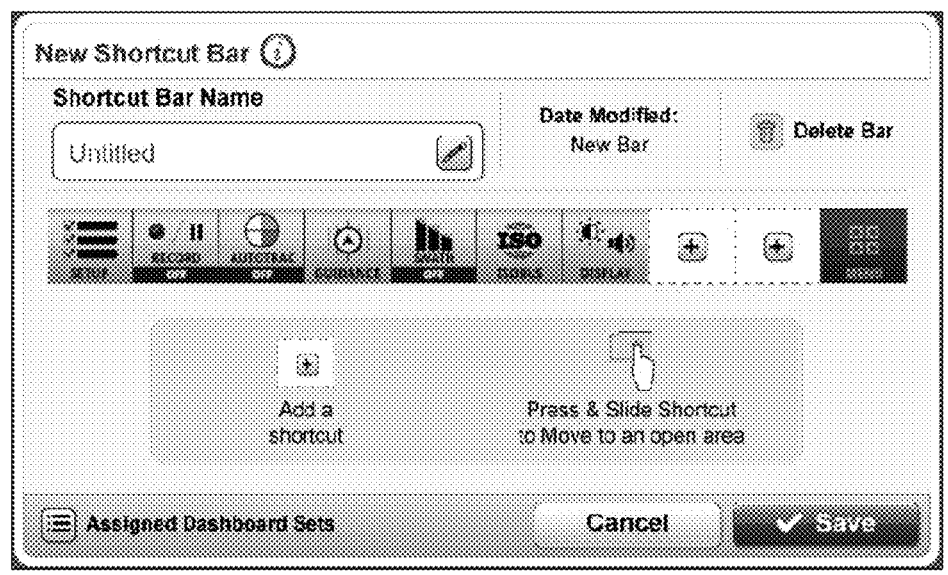

When a user selects to duplicate a new shortcut bar, the user interface 117 provides the processor 120 with the user's selection. The processor 120 provides the user interface 117 with data to display a duplicate shortcut bar overlay, as shown in FIG. 11D. The functionality of the user interface 117 with respect to the new shortcut bar overlay is the same as the functionality with respect to the edit shortcut bar overlay. Thus, for the sake of brevity, FIG. 11D will not be described in greater detail.

The processor 120 saves the duplicated shortcut bar in the data storage 125 when a user presses a save button 1114. The shortcut manager 121 manages the storage of the shortcut bars.

Figure 11E:

When a user presses the add a shortcut button 1108 in either the edit shortcut bar overlay or the new/duplicate shortcut bar overlay, the processor 120 provides the user interface 117 to display an add shortcut overlay, as shown in FIG. 11E.

The user interface 117 produces tabs 1115a, 115b and 1115c in the add shortcut overlay to select among recently used modules, tractor settings and system shortcuts.

The recent used shortcuts tab 1115a contains any shortcut that have been added to or removed from a shortcut bar during a session. For example, a session may be a period of time from a last restart to a next restart. The contents of the recently used tab 1115a may be sorted with a most recently used dashboard module at the top.

A content area 1120 of each tab contains a title icon grid with icons for each type of shortcut that is available within that category.

In the add shortcut overlay shown in FIG. 11E, the user interface 117 displays a list of application shortcuts in the content area 1120. When a user selects a shortcut to add, the processor 120 adds the shortcut to the shortcut bar and provides the user interface 117 to display an update shortcut bar with the selected shortcut bar in either the new/duplicate shortcut bar overlay or edit shortcut bar overlay.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A method for managing a display of a display system, the method comprising:
    establishing a run screen associated with a first function of a work vehicle;
    providing a location-determining receiver for potential guidance of the work vehicle;
    establishing a plurality of performance states of at least one of the location-determining receiver and a guidance controller; and
    displaying one or more of the performance states by corresponding visually displayable states without changing to another screen of the display, wherein the corresponding visually displayable states are displayed on an icon on the run screen, the corresponding visually displayable states being different transitions of the icon and the performance states are installed, configured, enabled and activated, the icon maintaining a same shape during the different transitions and the icon includes a Plurality of sections, the different transitions include shading different sections of the icon to correspond to the performance states, the different shadings correspond to the installed, configured, enabled and activated performance states, respectively.

2. The method according to claim 1, further comprising:
    changing the transition of the icon in response to a user command entered into a touch screen display.

3. The method according to claim 1, further comprising:
    changing the transition of the icon in response to status message data provided by the at least one of the location-determining receiver and the guidance controller.

4. The method according to claim 1, further comprising:
    issuing a call from a display operating system to a guidance program module, wherein the transition of the icon occurs in response to data transmitted from the guidance program module in reply to the call.

5. The method according to claim 4, wherein the guidance program module is one of (1) continuously active in a background data processing of the display system and (2) loaded into executable memory for the data processor.

6. The method according to claim 1, further comprising:
    changing the corresponding visually displayable state in response to a user command entered into a touch screen display.

7. The method of claim 1, wherein the first function is one of planting, plowing, spraying and harvesting.

8. The method of claim 1, further comprising:
    configuring the run screen with a retractable toolbar on the display, the icon being on the retractable toolbar.

9. The method of claim 8, further comprising:
    deploying the retractable toolbar over a first portion of the run screen.

10. A data processor for managing a display of a display system, the data processor configured to,
    establish a run screen associated with a first function of a work vehicle;
    provide a location-determining receiver for potential guidance of the work vehicle;
    establish a plurality of performance states of at least one of the location-determining receiver and a guidance controller; and
    display one or more of the performance states by corresponding visually displayable states without changing to another screen of the display, wherein the corresponding visually displayable states are displayed on an icon on the run screen, the corresponding visually displayable states being different transitions of the icon and the performance states are installed, configured, enabled and activated, the icon maintaining a same shape during the different transitions and the icon includes a plurality of sections, the different transitions include shading different sections of the icon to correspond to the performance states, the different shadings correspond to the installed, configured, enabled and activated performance states, respectively.

11. The data processor of claim 10, wherein the data processor is further configured to configure the run screen with a retractable toolbar on the display, the icon being on the retractable toolbar.

12. The data processor of claim 10, wherein the data processor is further configured to deploy the retractable toolbar over a first portion of the run screen.

\* \* \* \* \*